US007376120B2

(12) United States Patent
Miyawaki et al.

(10) Patent No.: US 7,376,120 B2
(45) Date of Patent: May 20, 2008

(54) RADIO BASE STATION SYNCHRONIZING RESPONSIVE TO CONDITIONS BEING MET

(75) Inventors: Katsushi Miyawaki, Yokohama (JP); Yuuichi Takahashi, Yokohama (JP)

(73) Assignees: Hitachi Communication Technologies, Ltd., Tokyo (JP); Hitachi Hybrid Network Co., Ltd., Yokohama-Shi (JP)

( * ) Notice: Subject to any disclaimer, the term of this patent is extended or adjusted under 35 U.S.C. 154(b) by 634 days.

(21) Appl. No.: 10/927,110

(22) Filed: Aug. 27, 2004

(65) Prior Publication Data

US 2005/0096033 A1     May 5, 2005

(30) Foreign Application Priority Data

Aug. 29, 2003    (JP)   ............................ 2003-307421

(51) Int. Cl.
     *H04J 3/06*        (2006.01)

(52) U.S. Cl. ...................... 370/350; 370/347; 370/321; 370/346; 370/337; 370/331; 370/324; 370/395.62; 370/503; 370/507; 370/509; 370/510; 455/436

(58) Field of Classification Search ................ 370/350, 370/342, 347, 337, 321, 346, 331, 324, 398.62, 370/503, 507, 509, 510; 455/436
See application file for complete search history.

(56) References Cited

U.S. PATENT DOCUMENTS

| | | | | |
|---|---|---|---|---|
| 5,978,679 | A * | 11/1999 | Agre ........................... | 455/442 |
| 6,308,078 | B1 * | 10/2001 | Van De Water ............ | 455/503 |
| 6,438,115 | B1 * | 8/2002 | Mazur et al. ............... | 370/330 |
| 2002/0012362 | A1 * | 1/2002 | Yahata et al. ............... | 370/503 |
| 2002/0086690 | A1 * | 7/2002 | Takahashi et al. .......... | 455/502 |
| 2004/0009751 | A1 * | 1/2004 | Michaelis et al. ............ | 455/62 |
| 2004/0077349 | A1 * | 4/2004 | Barak et al. ................. | 455/436 |
| 2004/0185869 | A1 * | 9/2004 | Lee et al. ................ | 455/456.1 |

FOREIGN PATENT DOCUMENTS

| | | |
|---|---|---|
| JP | 07-193859 | 7/1995 |
| JP | 07-322344 | 12/1995 |
| JP | 11-243580 | 9/1999 |
| JP | 2000-184436 | 6/2000 |
| JP | 2001-145155 | 5/2001 |
| WO | 02/095985 | 11/2002 |

* cited by examiner

*Primary Examiner*—Rafael Perez-Gutierrez
*Assistant Examiner*—Nimesh Patel
(74) *Attorney, Agent, or Firm*—Antonelli, Terry, Stout & Kraus, LLP.

(57) ABSTRACT

In the case of radio base stations of different kinds, a synchronization in a radio section cannot be established so that the efficiently effective use of electric waves cannot be retained. According to the invention, therefore, there is provided a TDMA type mobile communication system 100 comprising: a plurality of radio base stations of different system kinds (i.e., a general type radio base station 1, an IP connection type radio base station 10 and a main digital cordless phone 2); mobile phones 5A and 5B wirelessly connected with the plural radio base stations; and a private branch exchange 4 wired with the radio base stations. The radio base station receives, when a synchronized operation mode is decided, a frame signal containing a control CH signal, from a reference radio base station (i.e., a reference station); and times the transmission of the frame signal of a local station to the transmission position of the control CH signal in the frame signal, thereby to establish a frame synchronization in a radio section between own station and the reference radio base station.

11 Claims, 16 Drawing Sheets

1   GENERAL TYPE RADIO BASE STATION
    (RADIO BASE STATION)
2   MAIN DIGITAL CORDLESS PHONE
    (RADIO BASE STATION)
4   PRIVATE BRANCH EXCHANGE
5A, 5B  MOBILE PHONE
10  IP CONNECTION TYPE RADIO BASE STATION
    (RADIO BASE STATION)
100 TDMA TYPE MOBILE COMMUNICATION SYSTEM
    (MOBILE COMMUNICATION SYSTEM)

FIG.3

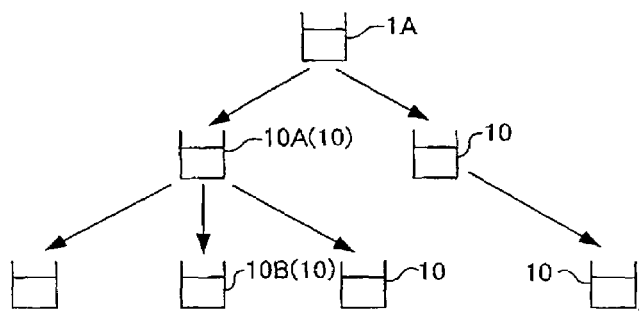

FIG.4

| ITEM NO. | CONDITIONS (302) | APPLICATIONS (303) |
|---|---|---|
| 1 | CALLING CODE IS IDENTICAL | DISCRIMINATION CONDITION FOR TERMINAL REGISTERED IN IDENTICAL SYSTEM |
| 2 | RECEPTION LEVEL IS AT PRESET VALUE OR MORE | CONDITION FOR RETAINING STABLE ACTION OF RADIO WAVE RECEPTION |
| 3 | SYNCHRONIZED WITH RADIO BASE STATION OF ADDITIONAL ID SMALLER THAN LOCALLY ADDITIONAL ID (BS NO.) | CONDITION FOR STABLE ACTION OF ENTIRE SYSTEM BY SELECTION OF EFFICIENT SYNCHRONIZATION DESTINATION |

FIG.5

| ITEM NO. | SETTING INFORMATION (304) | ID-ROM ADDRESS (305) | CONTENTS (306) | |
|---|---|---|---|---|
| 1 | ACTION MODE | 29 | 00 | SELF OPERATION MODE |
| | | | 01 | SYNCHRONOUS MODE |
| 2 | DESIGNATION OF TIMINGS FOR SEGREGATION STANDBY OF CONTROL CH SIGNAL FEEDING DEVICE | 105 | 00 - 60 | DESIGNATION OF TIMER UNIT (SEC.) |
| | | | 00 - 04 | DESIGNATION OF ADDITIONAL ID EFFECTIVE BIT |
| 3 | TIME FOR EXECUTING SYNCHRONOUS RETRY CONTROL | 30 | 00 - 23 | CORRESPONDING TO 24 HOURS |
| | | | 24 | INEFFECTIVE SETTING |

FIG.15

| EXAMPLE | CONFIRMATION MEANS | CONFIRMATION METHOD | CONFIRMATION INFORMATION |
|---|---|---|---|
| 1 | MAINTENANCE TERMINAL CONNECTED WITH SERIAL PORT OF CONTROL DEVICE | MAINTENANCE COMMAND INPUT | NOTIFY THE FOLLOWING INFORMATION FROM DESIGNATED BASE STATION<br>(1) RADIO BASE STATION ADDING ID OF SYNCHRONIZATION DESTINATION<br>(2) LOCAL STATION OPERATION MODE<br>    STATUS a: STARTING<br>    STATUS b: SELF OPERATION MODE<br>    STATUS c: SYNCHRONOUS MODE<br>    STATUS d: CLOSED<br>    STATUS e: TROUBLED OR POWER OFF STATE<br>(3) OTHER OPERATION INFORMATION<br>    (CH INFORMATION OR THE LIKE) |
| 2 | PC (COMMUNICATION SOFT) CONNECTED WITH LAN LINE | STATE RETRIEVAL COMMAND INPUT | THE SAME CONFIRMATION INFORMATION AS ABOVE |
| 3 | LAMP OR LCD DISPLAY | LUMINESCENT COLOR | DISPLAY IN LUMINESCENT COLORS BY LAMPS OR LEDS<br>    BLUE  : IN SYNCHRONOUS OPERATION<br>    GREEN : UNDER SELF OPERATION<br>    RED   : CLOSED |
| | | STATE DISPLAY | THE FOLLOWING STATES ARE DISPLAYED IN LCD<br>(1) RADIO BASE STATION ADDING ID OF SYNCHRONIZATION DESTINATION<br>(2) LOCAL STATION OPERATION MODE |

RADIO BASE STATION SYNCHRONIZING RESPONSIVE TO CONDITIONS BEING MET

BACKGROUND OF THE INVENTION

The present invention relates to a mobile communication system such as a time-division multiplexing access (as will be shortly called the "TDMA") type mobile communication system, which includes: a plurality of radio base stations whose interfaces with a control device are different type, such as a main digital cordless phone, a PHS (Personal Handy-phone System) radio base station (for example, a general type radio base station (i.e., a radio base station connected with an ISDN line), an IP (internet protocol) connection type radio base station (i.e., a radio base station connected with the internet protocol network); a mobile phone connected wirelessly with those radio base stations; and an exchange (e.g., a private branch exchange) wired with those radio base stations, wherein frame synchronization in a radio section between the radio base stations is established.

As referred to Japanese Patent Laid-open Publication No. 2001-145155, column Nos. [0001] to [0004], for example, there is a TDMA type mobile communication system includes: a general type radio base station; a main digital cordless phone; a private branch exchange equipped with a control device which controls the general type radio base station and the main digital cordless phone; a mobile phone connected wirelessly with the general type radio base station; and the digital cordless handset connected wirelessly with the main digital cordless phone, wherein the mobile phone can be communicatively connected through the general type radio base station, and the digital cordless handset can be communicatively connected through the main digital cordless phone.

FIG. 16 is a block diagram showing a schematic configuration of the inside of the general TDMA type mobile communication system.

The TDMA type mobile communication system 200 shown in FIG. 16 is arranged for business in the private area of an office or a factory, and includes: a plurality of general type radio base stations 1; a plurality of business main digital cordless phones 2; a private branch exchange 4 communicatively connected with the general type radio base stations 1 through an ISDN line 3 and communicatively connected with the main digital cordless phones 2, the private branch exchange 4 having a control device; a mobile phone 5A wirelessly connected with the general type radio base stations 1; and a digital cordless handset (as will be simply called the "mobile phone") 5B wirelessly connected with the main digital cordless phone 2.

The general type radio base station 1 executes calling control procedure in a ratio section on the basis of the RCR STD-28 as the standards of Association of Radio Industries and Business (ARIB), whereby services such as voice communications and data communications can be provided for the mobile phone 5A.

The main digital cordless phone 2 takes a one-to-one direct communication with the mobile phone 5B. Accordingly, electric waves are transmitted at the self operation timing without synchronization with another general type radio base stations 1, whereby services such as voice communications can be provided for the mobile phone 5.

The RCR standards regulate the frequency bands for voice communications between the mobile phone 5A and the general type radio base station 1 and the information configuration of the control CH signal as the call controlling signal which is used for frame synchronization and a carrier number. However, in same type mobile communication systems, common two frequencies, namely 12 ch and 18 ch are allocated to the control CH signal for the business, one of the same type mobile communication systems is obliged to avoid electric wave interference from another of the same type mobile communication systems.

When the general radio base stations 1 (1A, 1B) in the same system transmit the electric waves at an arbitrary timing, and their electric waves interfere with each other, electric wave using efficiency is reduced. In order to prevent the reduction of the electric wave using efficiency, therefore, it is necessary to match between electric wave transmission timings of the TDMA-TDD frames of the general type radio base stations 1 (1A, 1B) to retain frame synchronization between those general type radio base stations 1 (1A, 1B).

FIG. 17 is an explanatory diagram showing the concept of the TDMA-TDD frame which is used at a radio section of the TDMA type mobile communication system.

A TDMA-TDD frame 300 shown in FIG. 17 has a slot configuration of a radio section of second generation cordless telephone system standards, which is standardized by the ARIB. One slot 310, which is minimum unit, is composed of 240 bits (625 μs), and eight slots make one frame (5 ms).

Moreover, the one slot 310 is composed of a transient responding ramp time 311 of 4 bits, data 312 such as control information of 220 bits and a guard bit 313 of 16 bits. Between the succeeding slots 310, the total 20 bits of the guard bits (of 16 bits) 313 and the transient responding ramp time (of 4 bits) 311, that is, 52.1 μs make the allowance which absorbs the deviation between the slots.

In case the general type radio base stations 1 (1A, 1B) are in a frame synchronous state, as shown in FIG. 17, the electric waves for the TDMA-TDD frames of the general type radio base station 1A and the general type radio base station 1B are transmitted at the common timing. In order to hold this synchronized state, the deviation between the TDMA-TDD frame of the general type radio base station 1A and the TDMA-TDD frame of the general type radio base station 1B has to be confined in the allowable range.

Here, the operations till the general type radio base stations 1 retain the frame synchronization with each other will be described.

Each general type radio base station 1 establishes the frame synchronization between the general type radio base stations 1 (1A, 1B) by receiving synchronous signals for the reference of the frame synchronization through the ISDN line 3 of the private branch exchange 4 and by matching transmission timing of the TDMA-TDD frame with the synchronous signals thus received.

According to the TDMA type mobile communication system 200, moreover, when the frame synchronization is established between the general type radio base stations 1 (1A, 1B), it is necessary to determine transmitting timing of the control CH signal. The transmission position of the control CH signal has to be so controlled as to avoid the overlap between the general type radio base stations 1 (1A, 1B).

Here, a control CH signal transmission position segregation operation for preventing the overlap of the transmission positions of the control CH signal between the general type radio base stations 1 will be described. FIG. 18 is an explanatory diagram showing the general control CH transmission period conceptually.

A control CH transmission period 301 shown in FIG. 18 corresponds to an N-number ($25 \leq N \leq 60$) of frames 300 of 5 ms. Specifically, each general type radio base station 1 transmits the control CH signal of own station at an arbitrary frame position 1 to N and at a interval of N frames 300.

In case the general type radio base station 1A transmits the control CH signal at the timing "1", for example, the transmission timing of the next control CH signal is at "N+1". In other words, the general type radio base station 1 transmits the control CH signal of own station once at every interval of N frames 300.

Each of the general type radio base stations 1 use the control CH signal of own station to notify the transmission position of the control CH signal of own station within the interval range, in order of completion of starting such as the power ON. In response to this notified information, the surrounding general type radio base station 1 set up later determines the transmission position of the control CH signal of own station within the interval range while avoiding the transmission position of the control CH signal used by another general type radio base station 1, so that the transmission position of the control CH signal may not overlap between the general type radio base stations 1.

According to the TDMA type mobile communication system 200 thus far described, the synchronous signal is distributed from the private branch exchange 4 through the ISDN line 3 to each of the general type radio base stations 1. By matching the transmission timing of the TDMA-TDD frame of own station with the synchronous signal, therefore, the frame synchronization can be established between the general radio base stations 1 under the control of the same system.

According to the aforementioned TDMA type mobile communication system 200, moreover, when the frame synchronization between the general type radio base stations 1 is established, the transmission position of the control CH signal used by own station is searched within the interval range to determine the transmission position of the control CH signal of own station, so as to do not overlap the transmission position of the control CH signal of another general type radio base station 1. Then, the service operation is started.

According to the aforementioned TDMA type mobile communication system 200, moreover, the one-to-one direct communication is adopted between the main digital cordless phone 2 and the mobile phone 5. Therefore, the electric waves are transmitted at the self operation timing without any synchronization with another general type radio base station 1.

SUMMARY OF THE INVENTION

According to the aforementioned TDMA type mobile communication system 200, after the frame synchronization between the general type radio base stations 1 (1A, 1B) was established by using the synchronous signal from the private branch exchange 4, the segregation control is made so that the control CH signal transmission positions of the general type radio base stations 1 (1A, 1B) may not overlap each other. In the case of the IP connection type radio base station which is connected with the private branch exchange 4 through the LAN (Local Area Network), for example, it is conceivable for retaining the synchronization in the radio section with the general type radio base stations 1 to transmit the synchronous signal from the private branch exchange 4 to each IP connection type radio base station by using data packets. However, the delay or fluctuation of the data packets occur on the LAN so that the synchronous signal cannot be received at the same timing by all the IP connection type radio base stations. This synchronization cannot be established not only between the IP connection type radio base stations but also between the IP connection type radio base station and the general type radio base station 1. Still the worse, the segregation control to determine the transmission position of the control CH signal cannot be executed so that the efficiently effective use of the electric waves cannot be retained.

According to the aforementioned TDMA type mobile communication system 200, moreover, the main digital cordless phone 2 employs the one-to-one direct communication with the mobile phone 5B so that the electric waves are transmitted at the self operation timing without synchronization with another general type radio base station 1. However, the main digital cordless phone 2 and the general radio base station 1 use the common frequency band. In case the main digital cordless phone 2 is arranged in the service area which operates the general type radio base station 1, or example, the mobile phone 5B is subject to the influences of the electric waves of the nearer one of the general type radio base station 1 and the main digital cordless phone 2. Therefore, the electric waves interfere highly probably between the general type radio base station 1 and the main digital cordless phone 2. This may degrade the service quality.

The invention has been made in view of the points thus far described, and the synchronization in the radio section even between the different type radio base stations is established to retain the efficiently effective use of the electric waves and to improve the service quality drastically.

According to the invention, for example, there is provided a mobile communication system comprising: a plurality of radio base stations whose system types are different each other; mobile phones wirelessly connected with the plural radio base stations; and a private branch exchange wired with the plural radio base stations, wherein when the radio base station detects a synchronized operation mode setting, the radio base station receives a frame signal containing a control CH signal, from a reference radio base station which is one of the plural radio base stations except own station and is selected for reference to a frame synchronization, and matches transmission timing of the frame signal of own station with a transmission position of the control CH signal in the frame signal, whereby a frame synchronization in a radio section between own station and the reference radio base station is established.

Here, for example, the mobile communication system has radio synchronous conditions including a calling code indicating an identical system group between radio base stations, a threshold level which decides whether or not the reception level between the radio base stations is satisfactory, and an additional ID added to each group of the individual radio base stations. When the radio base station receives a frame signal containing a control CH signal from the radio base station except own station, the radio base station detects the calling code, the reception level and the additional ID of the radio base station which transmitted the frame signal, on the basis of control information contained in the control CH signal of the frame signal; and determines the radio base station as a reference radio base station of frame synchronization, if the calling codes of the radio base station and own station are identical, the reception level between the radio base station and own station is equal to or more than a threshold level, and it is decided that the radio base station satisfies all the conditions, on the basis of the comparison of the additional ID between the radio base station and own station.

Moreover, for example, when the present time becomes a preset one in case a synchronous state cannot be held in the radio section between own station and the reference radio base station, the radio base station receives the frame signal containing the control CH signal from the reference radio base station selected again; and matches the transmission timing of the frame signal of own station with a transmission position of the control CH signal in the frame signal, whereby a frame synchronization in the radio section between own station and the reference radio base station is established.

Moreover, for example, when the radio base station detects the synchronized operation mode setting, the radio base station starts a preset period timer, and starts the operation in a self operation mode to output electric waves of the frame signal at an arbitrary transmission timing of own station, in case the frame synchronization in the radio section between own station and the reference radio base station cannot be established till the predetermined period timer is up.

Moreover, for example, the radio base station has operation modes including a self operation mode, in which the electric waves of the frame signal are outputted at an arbitrary transmission timing of own station, and a synchronized operation mode, in which the electric waves of the frame signal of own station are outputted after the frame synchronization in the radio section between own station and the reference radio base station was established. And the private branch exchange can change the operation modes of each of the radio base stations to the self operation mode or the synchronized operation mode, in response to a predetermined operation.

Moreover, for example, the mobile communication system has additional IDs added to each group of the radio base stations. And after the frame synchronization was established in the radio section between own station and the reference radio base station, the radio base station controls start timing of a segregation control for determining the transmission position of the control CH signal of own station, so as to do not overlap the transmission position of the control CH signal of the radio base station except own station, on the basis of the timer period resulting from the accumulation of the less significant effective bit number of the additional ID of own station and the reference timer period.

BRIEF DESCRIPTION OF THE DRAWINGS

FIG. 3 is an explanatory diagram showing a synchronization establishing system between the base stations, which is a point of the TDMA type mobile communication system according to the embodiment.

FIG. 4 is an explanatory diagram showing radio synchronous conditions of the radio base station in the embodiment.

FIG. 5 is an explanatory diagram showing the set information of the radio base station in the embodiment.

FIG. 15 is an explanatory view showing an example which notifies the status information or the like of the radio base stations in the embodiment.

DETAILED DESCRIPTION OF THE PREFERRED EMBODIMENTS

Figure 1:
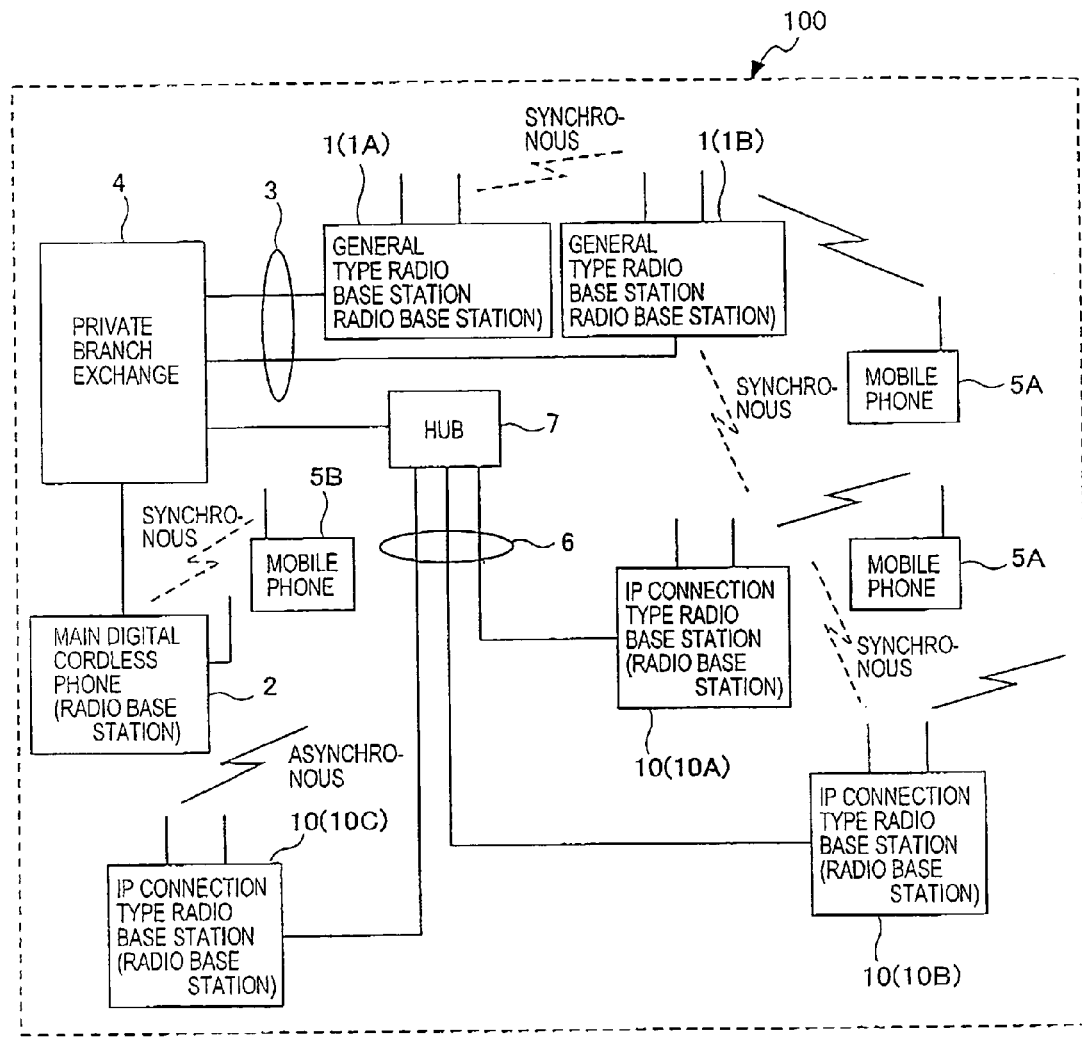
FIG. 1 is a block diagram showing a schematic configuration of the inside of a TDMA type mobile communication system according to an embodiment of the invention.
Figure 16:
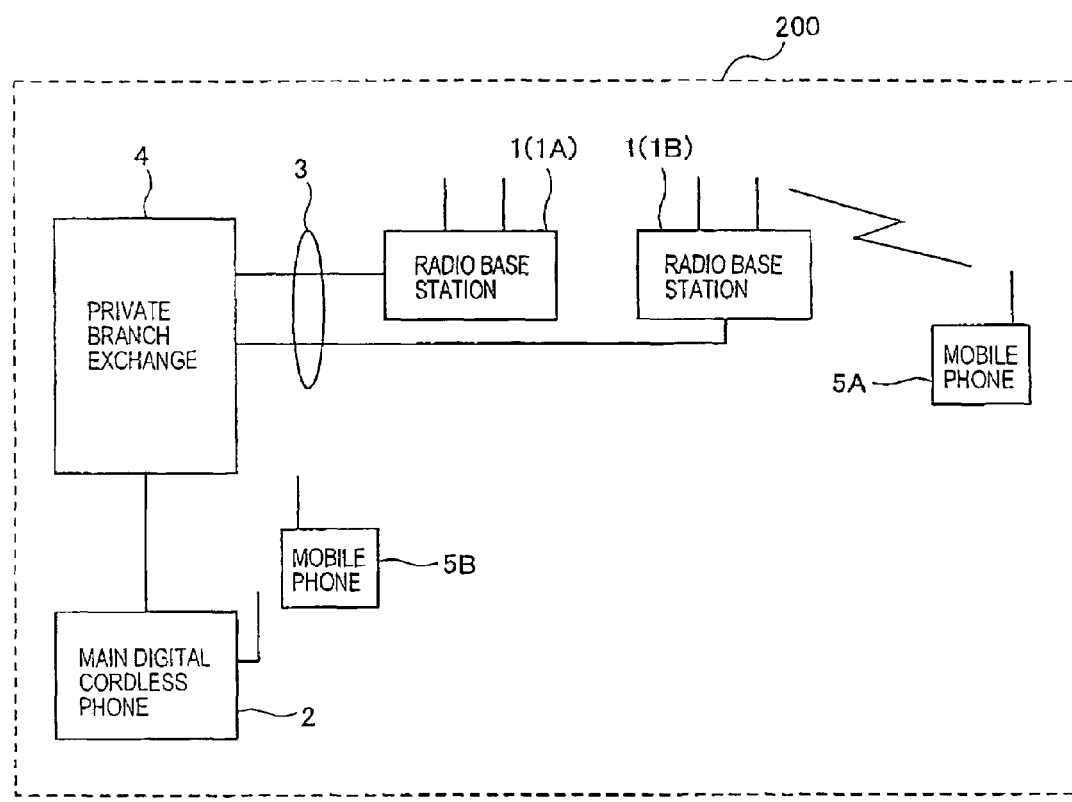
FIG. 16 is a block diagram showing a schematic configuration of the inside of the general TDMA type mobile communication system.
Figure 17:
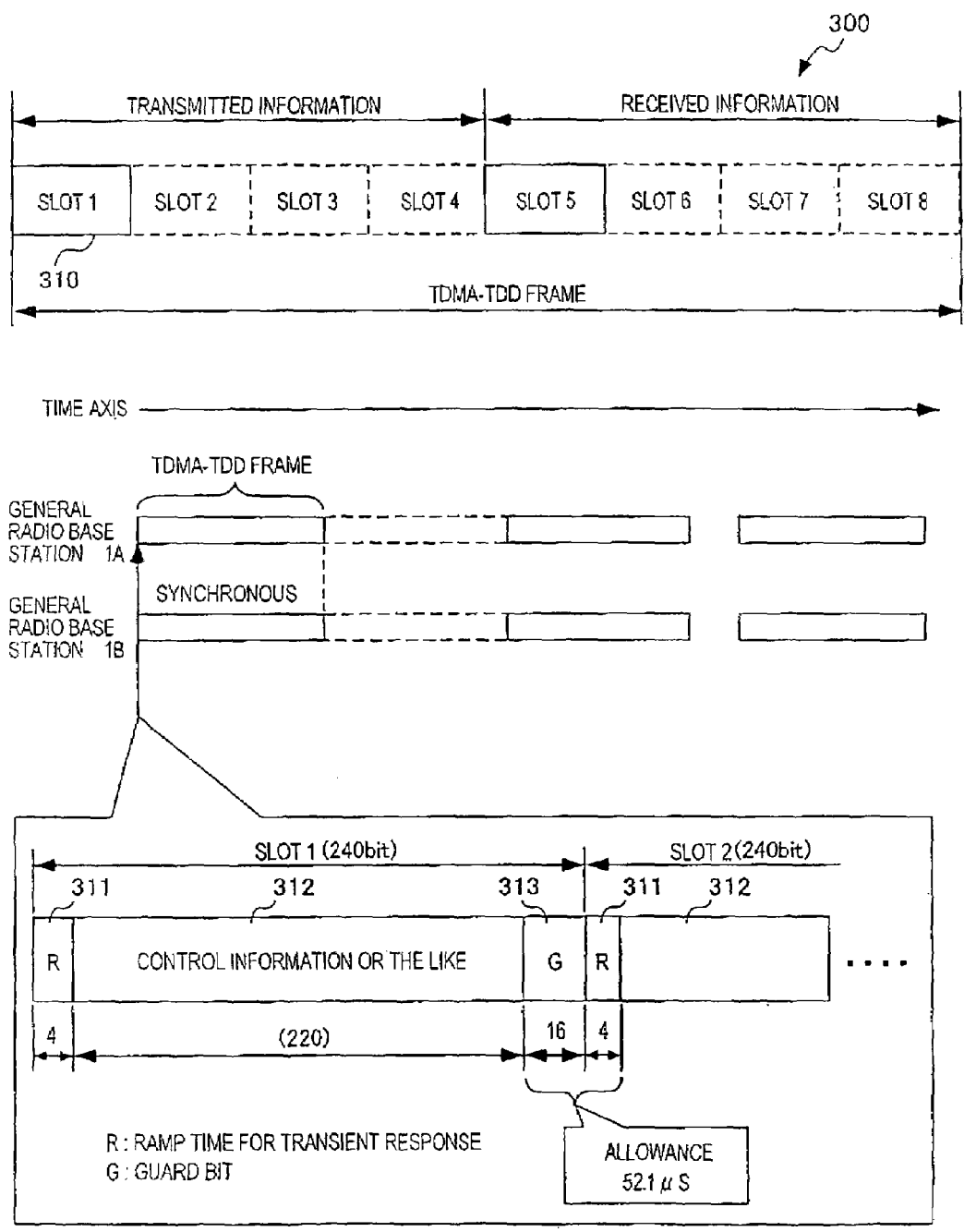
FIG. 17 is an explanatory diagram showing the concept of a TDMA-TDD frame to be used in the radio section of the general TDMA type mobile communication system.
Figure 18:
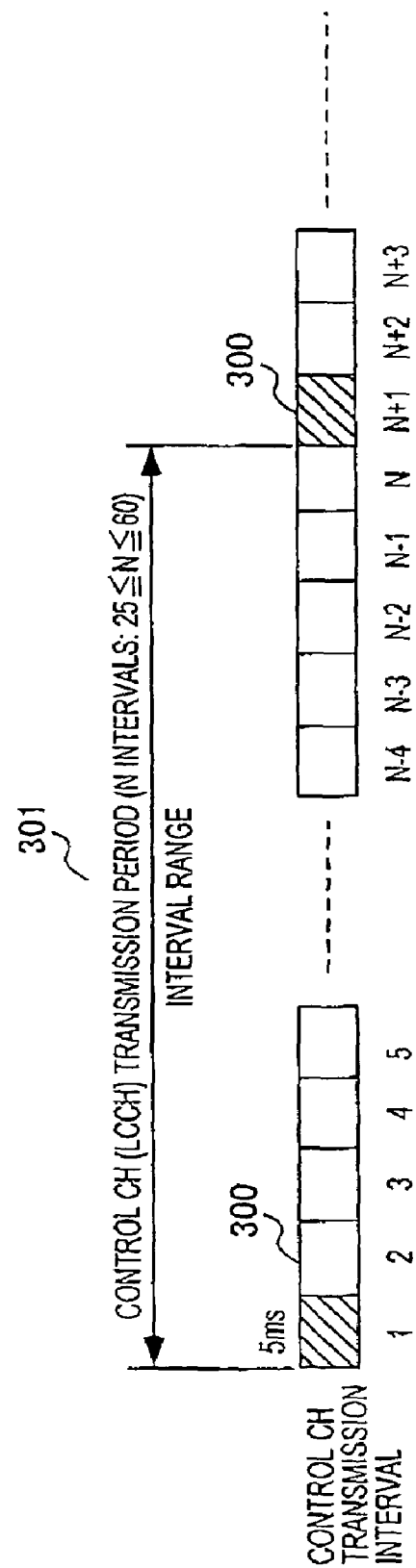
FIG. 18 is an explanatory diagram showing the control CH transmission period directly in the general TDMA type mobile communication system.

A TDMA type mobile communication system according to an embodiment of the invention will be described with reference to the accompanying drawings. FIG. 1 is a block diagram showing a schematic configuration of the inside of the TDMA type mobile communication system according to the embodiment. Here, the description of the overlapped configuration and operations are omitted by designating the same components as those of the TDMA type mobile communication system 200 shown in FIG. 16 by the common reference numerals.

A TDMA type mobile communication system 100 shown in FIG. 1 is configured to include: a plurality of general type radio base stations 1; a plurality of IP connection type radio base stations 10; a plurality of main digital cordless phones 2; a private branch exchange 4, which is communicatively connected with the general type radio base stations 1 through an ISDN line 3 and with the IP connection type radio base stations 10 through a LAN 6 and which is provided with a control device communicatively connected with the main digital cordless phone 2; a mobile phone 5A wirelessly connected with the general type radio base stations 1 and the IP connection type radio base stations 10; and a mobile phone 5B wirelessly connected with the main digital cordless phone 2.

It is assumed that the plural IP connection type radio base stations 10 are communicatively connected with the private branch exchange 4, through the LAN 6 and a switching HUB 7.

These general type radio base stations 1 and the IF connection type radio base stations 10 perform a calling control procedure in a radio section on the basis of the RCR STD-28 as the ARIB standards, so that services such as voice communications and data communications are provided for the mobile phone 5A by the common radio communication system.

Therefore, the mobile phone 5A can communicate with the arbitrary general type radio base stations 1 or the IP connection type radio base stations 10, which are arranged in the common system without distinguishing the general type radio base stations 1 and the IP connection type radio base stations 10.

Figure 2:
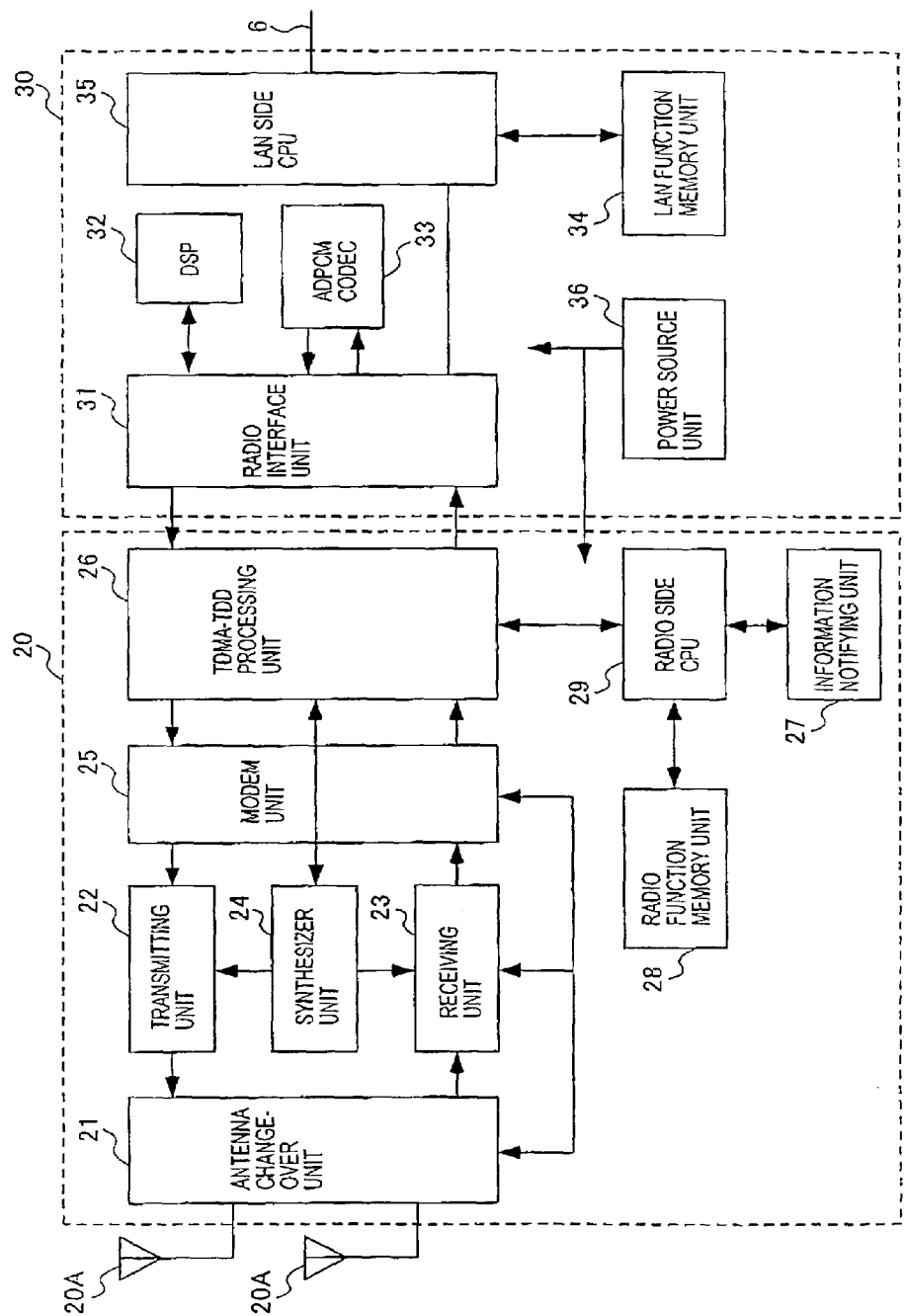
FIG. 2 is a block diagram showing a schematic configuration of the inside of an IP connection type base station relating to the TDMA type mobile communication system according to the embodiment.

FIG. 2 is a block diagram showing a schematic configuration of the inside of the IF connection type base station 10.

The IP connection type radio base station 10 shown in FIG. 2 is configured to include a radio function block 20 and a LAN function block 30.

The radio function block 20 includes two antennas 20A which transmits/receives electric waves; an antenna change-over unit 21 which changes (switches) the two antennas 20A; a transmitting unit 22 which transmits electric waves; a receiving unit 23 which receives electric waves; a synthesizer unit 24 which generates a frequency used in the transmitting unit 22 and the receiving unit 23; a modem unit 25 which modulates/demodulates data; a TDMA-TDD processing unit 26 which converts into a TDMA-TDD frame; an information notifying unit 27 such as an LCD or LED, which notifies various information on the radio function block 20; a radio function memory unit 28 which stores various contents on the radio function block 20; and a radio side CPU 29 which controls the radio function block 20 as a whole.

The LAN function block 30 includes: a radio interference unit 31 which manages a interface with the radio function block 20; a DSP 32 which executes packet processing of voice data received on both the radio side and the LAN side; an ADPCM CODEC 33 which compresses/expands 32 k-ADPCM voice data; a LAN function memory unit 34 which stores various information on the LAN function block 30; a LAN side CPU 35 which manages a LAN interface function for communicatively connecting with the LAN 6 and controls the LAN function block 30; and a power source unit 36 which supplies an electric power to both the radio function block 20 and the LAN function block 30.

The feature of the TDMA type mobile communication system 100 according to the embodiment will be described at first. FIG. 3 is an explanatory diagram showing the feature of the TDMA type mobile communication system 100 according to the embodiment.

The feature of the TDMA type mobile communication system 100 is to establish synchronization among radio sections of the general type radio base station 1, the IP connection type radio base station 10 and the main digital cordless phone 2. For example, the general type radio base station 1 is used as a reference station, and the IP connection type radio base station 10 and the main digital cordless phone 2 match electric wave transmission timing (i.e., TDMA-TDD frame transmission timing) of own station with electric wave transmission timing (i.e., TDMA-TDD frame transmission timing) of the reference station, whereby the synchronization among the general type radio base station 1, the IP connection type radio base station 10 and the main digital cordless phone 2 is established.

With reference to FIG. 3, here will be described an example, in which the IP connection type radio base station 10 (10A, 10B) synchronizes the general type radio base station 1A which acts as the reference station.

The IP connection type radio base station 10A receives the electric waves from the reference station 1A and matches electric wave transmission timing of own station 10A with electric wave transmission timing of the reference station 1A to transmit the electric waves of own station 10A.

The other TP connection type radio base station 10B receives the electric waves of the IP connection type radio base station 10A and matches electric wave transmission timing of own station 10B with the electric wave transmission timing of The IP connection type radio base station 10A to transmit the electric waves of own station 10B. By thus matching the electric wave transmission timing of own station sequentially to the electric wave transmission timing of the reference station 1A, it is possible to retain the synchronization among the radio sections of the general type radio base station 1, the IP connection type radio base station 10 and the main digital cordless phone 2.

The general type radio base station 1 is adopted as the reference station for reference to the radio synchronization and matches the electric wave transmission timing with a synchronous signal from the private branch exchange 4 to transmit the electric waves. Accordingly, in the case that plurality of the general type radio base stations 1 exist, even if the electric wave transmission timing is matched with the electric wave transmission timing of any general type radio base station 1, the same electric wave transmission timing is obtained.

In the case of the IP connection type radio base station 10C which is so solely arranged that the radio area does not overlap another radio base stations, the IP connection type radio base station 10C may transmit the electric waves at an arbitrary electric wave transmission timing by setting the later-described operation mode (namely self operation mode). Accordingly, the IP connection type radio base station 10C can be operated in an asynchronous state.

Even if the synchronization is established between the general type radio base station 1A and the IP connection type radio base station 10A, the electric waves received as the synchronous signal actually have a deviation within a preset range in the hardware of a packaged circuit of the IP connection type radio base station 10, although this IP connection type radio base station 10 uses a highly precise timing clock.

When both of the general type radio base station 1A acting as the reference station and the IP connection type radio base station 10A synchronized with the general type radio base station 1A have such the deviation, a timing deviation between the TDMA-TDD frame of the general type radio base station 1A and the TDMA-TDD frame of the IP connection type radio base station 10A occurs with the lapse of time.

In order to retain a stable operation by the radio synchronization for coping with this situation, there is needed check of the radio base station by synchronizing with which the most stable operation state can be obtained, a procedure regarding to a synchronous control which allows the whole system to become stable synchronous state, and a control which holds the synchronous state continuously even after the operation start of the system.

There is further needed a procedure for the instant when the synchronous state cannot be held to cause an asynchronous deviation by a trouble of the synchronization destination radio base station in operation or by a radio interference from a radio base station or repeater of another system. Thus the concrete processing for coping with this situation will be described.

At first, for the general type radio base station 1, the IP connection type radio base station 10 and the main digital cordless phone 2, a variety of radio synchronous conditions determining the conditions of the synchronization destination radio base station are determined to retain the stable operation by the radio synchronization. FIG. 4 is an explanatory diagram showing the contents of the radio synchronous conditions directly.

Radio synchronous conditions 302 shown in FIG. 4 are three conditions of: a calling code indicating that the radio base station (i.e., the general type radio base station 1, the IP connection type radio base station 10 and the main digital cordless phone 2) belongs to a common system group; a reception level regulation indicating a threshold level which decides whether or not the reception level between the radio base stations is satisfactory; and a own (locally) additional ID added to each group of the individual radio base stations. The individual conditions 302 and their applications 303 are as follows.

The calling code is to recognize that the radio base station belongs to the system group, if identical to that of the identical system group.

The reception level regulation is to judge that the reception level with the radio base station is satisfactory when the reception level with the radio base station is equal to or more than the threshold level, and provides a condition for retaining the stable operation of the periodic radio reception in the synchronous operation.

The own additional ID is a number which is given to each group of the individual radio base stations under consideration of the arrangement of the devices in the actual service area of the radio base stations (i.e., the general type radio base station 1, the main digital cordless phone 2 and the IP connection type radio base station 10). For example, a small number is given to the general type radio base station 1 which can acquire a stable synchronous signal from the private branch exchange 4, and numbers are given to the main digital cordless phone 2 and the IP connection type radio base station 10 in the order of the arrangement closer to the general type radio base station 1. In the physical arrangement of the radio base stations, more specifically, the locations are made such that the reference radio base station is given the smallest additional ID, such that another IP connection type radio base station 10 synchronized with the reference radio base station is given a larger number, and such that the IP connection type radio base station 10 physically arranged at the larger distance from the center of the reference radio base station is given the larger number.

In case the ID added to own station and the ID added to the radio base station are compared to find that the ID added to the radio base station is smaller than the ID added to own station, that radio base station is selected as the synchronization destination radio base station.

Therefore, it is possible to judge that the conditions for the synchronization destination radio base station are satisfied, when all of the radio synchronous conditions such as the calling code, the reception level and the own additional ID are satisfied.

At the system starting time, the starting order is made such that the radio synchronous operation is started sequentially from the IP connection type radio base station 10 arranged near the reference radio base station such as the general type radio base station 1 by, for example, setting the general type radio base station 1 as a starting point, and such that the IP connection type radio base station 10 or the main digital cordless phone 2 at the remote end is synchronously operated at last.

As a result, the entire system establishes the pyramid type radio synchronization, which has the reference radio base station at the crest, as shown in FIG. 3, so that the synchronous state can be easily grasped. Even in case an asynchronous state occurs to establish the self operation mode, another radio base station referring to the radio base station having become asynchronous is enabled to continue the synchronous operation by transmitting the electric waves continuously at a timing before the asynchronous state occurs, so that the influential range can be confined within a partial one. Moreover, the restoration from that asynchronous state can also be executed autonomously and partially without affecting the entire system.

On the other hand, the general type radio base station 1, the IP connection type radio base station 10 and the main digital cordless phone 2 are provided with individual pieces of set information relating to the radio synchronization control. FIG. 5 is an explanatory diagram showing the contents of the individual pieces of set information on the radio synchronization control.

Setting information 304 shown in FIG. 5 is stored at a designated address 305 of the ID-ROM packaged in each of the general type radio base station 1, the IP-connection type radio base station 10 and the main digital cordless phone 2, and has the following contents 306.

The setting information 304 shown in FIG. 5 contains: the operation mode set for own station; the reference timer period (or timer unit) or the parameter of the starting timer period, for which a segregation control to decide the transmission position of the control CH signal of own station is started, and the less significant effective bit number of own station; and the synchronous retry control execution time, at which the synchronous retry control or the later-described radio synchronous control maintaining function of own station is executed.

The operation mode contains: the self operation mode, in which the electric waves are outputted at an arbitrary transmission timing of own station; and the synchronized operation mode, in which the electric waves are outputted after the radio synchronization between own station and the reference radio base station was established, that is, the synchronized operation mode, in which the radio synchronization is taken with another radio base station.

The reference timer period is set at 0 to 60 seconds, and the less significant effective bit number of the additional ID is set at 00 to 04. In case the reference timer period is 30 seconds and in case the less significant bit number is "4", the segregation standby timing period is 30 seconds×4=120 seconds. The less significant bit number of the additional ID corresponds to the group number.

The synchronous retry control execution time is set at 00 to 23 o'clock so that it is "02" if set at 2 a.m., for example. In case the synchronous retry execution time is set at XX, for example, other than "00 to 23", it is assumed that the synchronous retry execution time is not set with the instant.

The radio synchronous conditions 302 shown in FIG. 4 and the setting information 303 shown in FIG. 5 can be arbitrarily altered in their settings, for example, by a command operation from a maintenance terminal connected with the control device of the private branch exchange 4.

Here, the operations of the TDMA type mobile communication system 100 according to the embodiment will be described. The soft controls, as shown in each flow chart in connection with the radio synchronization control described in the embodiment, conform to the communication control method of the self-owned standard system which is settled in the second-generation cordless telephone system standards (RCR STD-28 Standards) of the ARIB. For conveniences, the description will be made by designating the general type radio base station 1 as the reference station and the IP connection type radio base station 10 as the radio base station in radio synchronization with that reference station.

Figure 6:
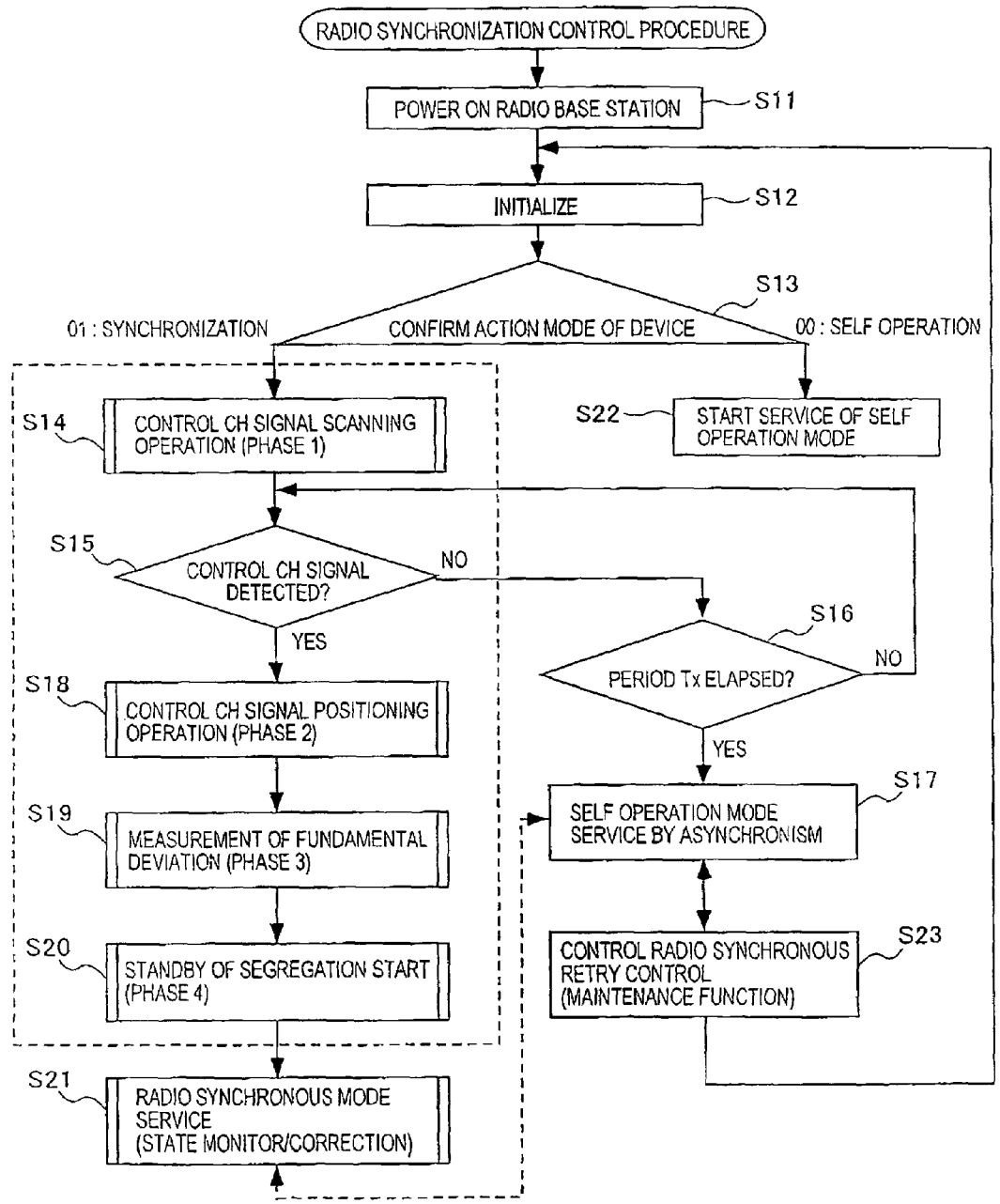
FIG. 6 is a flow chart showing processing operations on the radio synchronization controlling procedure of the IP connection type radio base station in the embodiment.

FIG. 6 is a flow chart showing processing operations on the radio synchronization controlling procedure of the IP connection type radio base station 10.

The radio synchronization controlling procedure shown in FIG. 6 covers not only various operation from the start of the power source of the IP connection type radio base station 10 to the operation of the self operation mode service or the synchronized operation mode service ran by the IP connection type radio base station 10 but also the maintenance function to stabilize those service runs.

In FIG. 6, the radio side CPU 29 of the IP connection type radio base station 10 executes, when the power is ON (at Step S11), the initialization of the stored software (at Step S12), and then confirms the operation mode set in the internal ID-ROM (or the radio function memory unit 28) shown in FIG. 5, i.e., the operation mode setting of own station (at Step S13).

When it is decided at Step S13 that the operation mode is the synchronized operation mode "01", the radio side CPU 29 retrieves the peripheral radio base station, and executes a control CH signal scanning operation to scan the transmitted position of the control CH signal of the radio base station as a detected candidate for the synchronization destination (at Step S14). This control CH signal scanning operation detects the transmitted position of the control CH signal within an internal range 301 of the control CH transmission period shown in FIG. 7.

Figure 7:
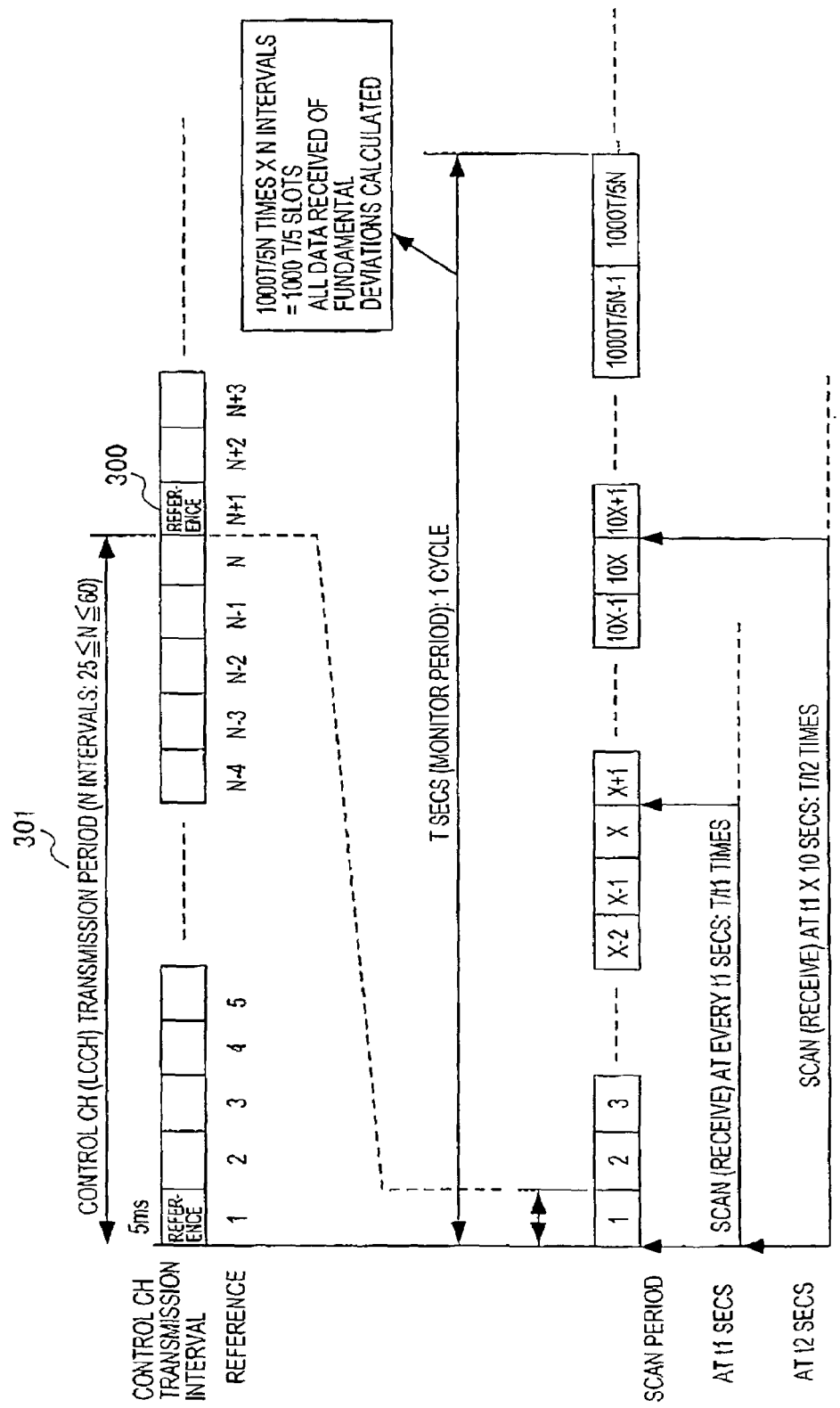
FIG. 7 is an explanatory diagram showing the relations of each monitor period directly in control CH transmission periods according to the embodiment.

The radio side CPU 29 decides (at Step S15) whether or not the control CH signal of the radio base station for the synchronization destination candidate, which satisfies the radio synchronous conditions shown in FIG. 4 has been detected within the interval range 301 of the control CH transmission period shown in FIG. 7 during the control CH signal scanning operation at Step S14.

When the control CH signal is not detected at Step S15, the radio side CPU 29 decides (at Step S16) whether or not a detection execution period Tx for detecting the control CH signal has elapsed the detection execution period Tx is to a start timing operation when the control CH signal scanning operation is started.

When the detection execution period Tx elapsed, the radio side CPU 29 decides that the control CH signal of the radio base station for the synchronization destination candidate satisfying the radio synchronous conditions shown in FIG. 4 could not been detected within the detection execution period Tx, handles as a failure in the radio synchronization, and starts the operation forcibly in the self operation mode service (at Step S17). In this self operation mode service, the service operation in the self operation mode is started by executing the segregation control operation to determine the transmission position of the control CH signal of own station at an arbitrary electric wave timing of own station withouttaking any synchronization with another radio base station.

When it is decided at Step S16 that the detection execution period Tx has not elapsed, on the other hand, the radio side CPU 29 transfers to Step S15 so as to detect the control CH signal of the radio base station of the synchronization destination candidate within the interval range.

When the transmission position of the control CH signal of the radio base station for the synchronization destination candidate is detected at Step S15, the radio side CPU 29 executes a control CH positioning adjusting operation for adjusting the transmission position of the control CH signal of own station to the transmission position of the control CH signal of the radio base station as the synchronization destination candidate. This control CH positioning adjusting operation is to match the TDMA-TDD frame of the radio base station as the synchronization destination candidate with the TDMA-TDD frame of own station.

After adjustment of the transmission positions of the control CH signals of the radio base station as the synchronization destination candidate and own station at Step S18, the radio side CPU 29 executes a fundamental deviation measuring operation for measuring the timely deviation from the control CH signal of the synchronization destination for every preset periods, and accumulating the measured deviation as the fundamental deviation data of the bit unit in a fundamental deviation accumulating counter (at Step S19).

After the control CH signal scanning operation of Step S14, the control CH positioning adjusting operation at Step S18 and the fundamental deviation measuring operation of Step S19, the radio side CPU 29 establishes the frame synchronization between the radio base station as the synchronization destination and own station.

After the fundamental deviation measuring operation of Step S19, the radio side CPU 29 executes a segregation start standby operation of the control CH signal transmission position of own station (at Step S20). This segregation start standby operation is to shift the start timing of the segregation control for determining the transmission position of the control CH signal of own station, and then to determine the transmission position of the control CH signal of own station at an optimum transmission position so that the transmission position of the control CH signal of own station may not overlap that of the control CH signal of another radio base station.

At the completion of the segregation start standby operation at Step S20, the radio side CPU 29 completes the all operations regarding to the radio synchronization control and starts the service operation in the radio synchronous mode, while continuing the monitor of the radio base station as the synchronization destination and the correction of the synchronous timing deviation, so as to hold the synchronous operation state (at Step S21).

When it is decided at Step S13 that the operation mode is the self operation mode "00", on the other hand, the radio side CPU 29 starts the operation of the self operation mode (at Step S22) without the radio such as the single arrangement in which the electric waves do not overlap those of another radio base station. In the self operation mode, the service operation in the self operation mode is started by executing the segregation controlling operation without any synchronization with another radio base station so that the transmission position of the control CH signal of own station may be determined at an arbitrary electric wave timing of own station.

When the present time comes to the synchronous retry control executing time shown in FIG. 5 during the self operation mode service of Step S17 due to the failure in the radio synchronization, the radio side CPU 29 executes a synchronous retry control operation as a maintenance function (at Step S23). In this synchronous retry control operation, the radio synchronization controlling operation is executed again by resetting the device autonomously for the restart at the synchronous retry control execution instant set in the internal ID-ROM.

The radio side CPU 29 transfers to Step S12 so as to execute the radio synchronization controlling operation again after it executed the synchronous retry control operation at Step S23 for the restart.

Moreover, the radio synchronization retry control operation or Step S23 is started when the present time comes to the aforementioned synchronous retry control execution instant, even in case the unsynchronization is caused to shift the operation to the self operation service of Step S17 by the trouble of the radio base station of the synchronization destination or the electric wave interference coming from the outside not only during the self operation service of Step S17 but also after the start of the service operation in the radio synchronous mode in Step S21.

Figure 8:
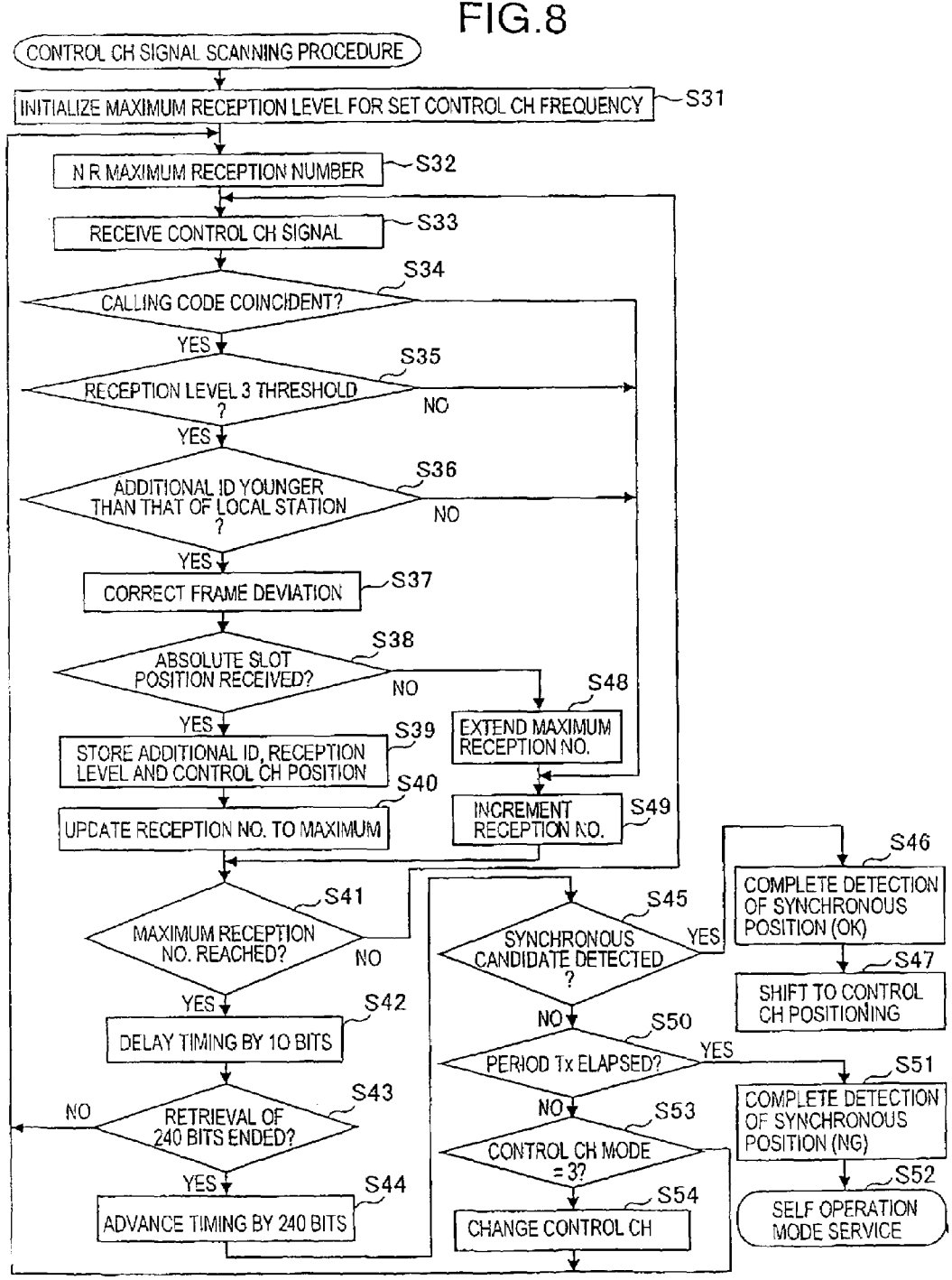
FIG. 8 is a flow chart showing processing operations on the CH signal scanning procedure of the IP connection type radio base stations in the embodiment.

Here, the control CH signal scanning operation of Step S14 in the radio synchronization controlling operation of FIG. 6 will be described. FIG. 8 is a flow chart showing processing operations on the CH signal scanning procedure of the IP connection type radio base stations 10.

In FIG. 8, the radio side CPU 29 initializes the maximum reception level for the set control CH signal frequency (at Step S31), and sets the maximum reception number of the control CH signal at an arbitrary value N within a regulated control CH transmission period (N=25 to 60) of the RCR STD-28 standards (at Step S32). After this, the radio side CPU 29 starts the operation to receive the control CH signal within the N-interval range (at Step S33).

The radio side CPU 29 decides (at Step S34) whether or not the calling code of the control CH signal received is coincide with the calling code of own station relating to the radio synchronous conditions shown in FIG. 4. Here, the calling code of the control CH signal is acquired with the control information (as will be simply called the "control CH information") contained in the control CH signal which is periodically notified at the N-intervals.

When the coincidence of the calling code is decided, the radio side CPU 29 decides whether or not the reception level of the received control CH signal is at least the threshold level regulating the reception level relating to the radio synchronous conditions shown in FIG. 4 (at Step S35). Here, the reception level of the control CH signal is acquired with the control CH information which is periodically notified at the N-intervals.

When it is decided that the reception level is at least the threshold level, the radio side CPU 29 decides whether or not the additional ID of the radio base station relating to the received control CH signal is smaller than the additional ID of own station relating to the radio synchronous conditions shown in FIG. 4 (at Step S36). Here, the additional ID of the control CH signal relating to the control CH signal is acquired with the control CH information which is periodically notified at the N-intervals.

When it is decided that the additional ID of the control CH signal received is smaller than that of own station, the radio side CPU 29 judges that the control CH signal satisfies all the radio synchronous conditions shown in FIG. 4, and that the control CH signal is that of the radio base station of the synchronization destination candidate.

Moreover, the radio side CPU 29 performs a correcting operation to match frame timing of the radio base station as the synchronization destination candidate detected with that of own local station (at Step S37). Here, this correcting operation is to correct the deviations sequentially every time the control CH signal is received. The radio side CPU 29 decides whether or not absolute slot position information has been received with the control CH information which is periodically notified at the N-intervals (at Step S38). Here, the absolute slot position information is the transmission slot position of the control CH signal in the TDMA-TDD frame of the radio base station as the synchronization destination candidate, and is notified as the radio channel information by the super frame as the configuration unit of all the control CH information elements transmitted at every N-intervals.

When the absolute slot position information is received, the radio side CPU 29 recognizes the transmission position of the control CH signal of the radio base station as the synchronization destination candidate at the slot unit, and stores transmission positions of the additional ID, the reception level and the control CH signal of the radio base station as the synchronization destination candidate into the radio function memory unit 20 (at Step S39).

Moreover, the radio side CPU 29 judges that the reception of the control CH signal at that scan timing succeeded, and updates the reception number forcibly to the maximum reception number so as to avoid the unnecessary receiving operations of the control CH signal anymore within the regulated interval range (at Step S40).

The radio side CPU 29 decides (at Step S41) whether or not the reception number has reached the maximum reception number. When the maximum reception number is reached, the radio side CPU 29 shifts the timing in the delay direction by 10 bits of 240 bits per slot (at Step S42), and decides whether or not the retrieval of the timing of all 240 bits of the slot, to which that control CH signal was assigned, has been completed (at Step S43).

Here, the shifting operation of Step S42 in the direction to delay the timing by 10 bits is regulated by the bit width which can be scanned by the single operation depending on the hardware performance of the device. The shifting operation is repeated till retrieval of the timing of all 240 bits of the slot, to which the control CH signal is assigned at said interval of 10 bits, is completed, and the routine transfers to Step S32 so as to execute the scanning operation of the control CH signal.

When the retrieval of all 240 bits was completed at Step S43 for the N-intervals, the radio side CPU 29 recognizes the transmission position of the control CH signal at the slot unit and at the bit unit with the timing shift of 10 bits of Step S42, and stores the precise transmission position of the control CH signal at Step S39.

When the retrieval of all 240 bits is completed at Step S43, therefore, the radio side CPU 29 judges that the transmission position of the control CH signal of the radio base station of the synchronization destination candidate has been completely scanned all over the range of the N-intervals, and advances the timing by 240 bits to the retrieval starting position or the initial position (at Step S44). By these series of control CH signal scanning operations, the radio side CPU 29 decides whether or not the control CH signal reception has succeeded to detect the radio base station of the synchronization destination candidate (at Step S45).

When the radio base station of the synchronization destination candidate was detected and when the reception of the absolute slot position of the control CH signal succeeded, the radio side CPU 29 notifies the more significant channel task of control CH receiving operation data (e.g., the calling code, the reception level and the reception timing deviation) as the completion of the synchronous position detection (at Step S46), and shifts to the control CH positioning operation of Step S19 of FIG. 6 (at Step S47).

When it is decided at Step S38 that the absolute slot position information was not received although the radio synchronous conditions were satisfied, moreover, the radio side CPU 29 extends the maximum reception number so as to continue the reception monitor of the absolute slot position information (at Step S48). Like the cases of Step S34, Step S35 and Step 536, in which the radio synchronous conditions were not satisfied, the radio side CPU 29 increments the counter of the reception number by +1 (at Step S49), and transfers to Step S41 so as to judge whether or not the reception number has reached the maximum reception number.

When it is decided at Step S41 that the reception number has not reached the maximum, the radio side CPU 29 transfers again to Step S33 so as to detect the control CH signal satisfying the radio synchronous conditions.

When the radio base station of the synchronization destination candidate is not detected at Step S45, the radio side CPU 29 decides whether or not the guard time Tx (or the detection execution period) owned by the controlling software has elapsed (at Step S50).

When the guard time Tx (or the detection execution period) has elapsed, the radio side CPU 29 notifies the more significant channel task of the failure in the synchronous position detection (at Step S51), and operates the operation forcibly with the self operation mode service of Step S17 of FIG. 6 (at Step S52).

When it is decided at Step S50 that the guard time Tx has not elapsed, on the other hand, the radio side CPU 29 decides whether or not the control CH mode is at "3" (at Step S53). Here, the control CH mode is set: at "3" in case both the control CH signals assigned to the two frequencies of 12 CH and 18 CH are used; at "1" in case only the control CH signal of 12 CH is used; and at "2" in case only the control CH signal of 18 CH is used.

When it is decided that the control CH mode is at "3", the radio side CPU 29 changes the control CH signal into the unscanned one of the two frequencies (at Step S54), and the routine transfers to Step S32 so as to receive the control CH signal of the unscanned frequency.

When it is decided at Step S53 that the control CH mode is not at "3", on the other hand, the radio side CPU 29 transfers to Step S32 so as to receive the sane control CH signal again till the period Tx elapses.

According to the control CH signal scanning operation shown in FIG. 8, the precise transmission position of the control CH signal relating to the radio base station as the synchronization destination candidate satisfying the radio synchronous conditions can be detected not only at the slot unit but also at the bit unit.

Figure 9:
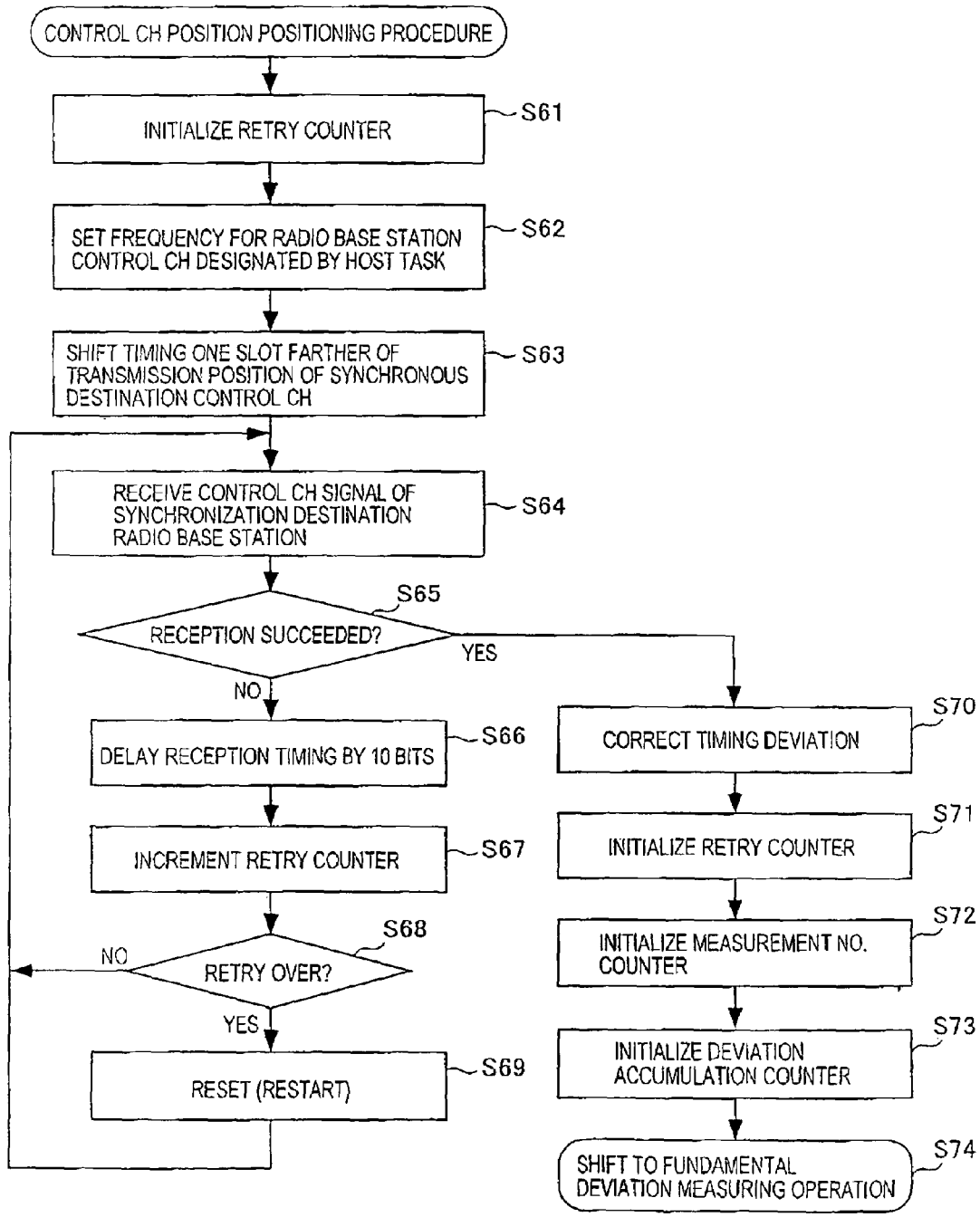
FIG. 9 is a flow chart showing processing operations on the control CH positioning procedure of the IP connection type radio base stations in the embodiment.

Here, the control CH positioning operation of Step S18 in the radio synchronization controlling procedure of FIG. 6 will be described. FIG. 9 is a flow chart showing processing operations on the control CH positioning procedure of the IP connection type radio base station 10.

In FIG. 9, the radio side CPU 29 initializes the retry counter (at Step S61), and then sets the frequency for the control CH signal of the synchronization destination radio base station (at Step S62).

The radio side CPU 29 shifts the timing of own station one slot farther of the transmission position of the control CH signal of the synchronization destination radio base station so as to avoid the failure in the positioning adjusting operation due to a deviation of the transmission timing of the control CH signal of the synchronization destination radio base station, caused by the time lapse till the shift from the control CH signal scanning procedure of FIG. 8 to the control CH positioning procedure (at Step S63).

Moreover, the radio side CPU 29 executes an operation to receive the control CH signal of the synchronization destination radio base station (at Step S64), and decides whether or not the reception of that control CH signal has succeeded (at Step S65). At the beginning of the reception start of the control CH signal, own station timing is shifted one slot farther from the synchronization destination at Step S63 so that the control CH signal of the synchronization destination radio base station cannot be received.

When the reception of the control CH signal failed at Step S65, the radio side CPU 29 shifts in the direction to delay the reception timing by 10 bits so as to match the transmission position of the control CH signal of own station with that of the synchronization destination radio base station (at Step S66), and increments the retry counter by +1 at every shifts (at Step S67).

The radio side CPU 29 decides whether or not the retry is over, that is, whether or not the retry counter has taken a number (25 times) exceeding the timing shift of one slot (or 240 bits) (at Step S68).

When it is decided that the retry has been over, the radio side CPU 29 decides that the electric waves of the synchronization destination radio base station cannot be received by some cause so that the synchronization is impossible, and resets the device forcibly for the restart (at Step S69). Then, the present procedure transfers to Step S64 so as to receive the control CH signal of the synchronization destination radio base station again. Since the device is reset at this time, the procedure of the entire software is reopened from the radio base station power ON of Step S11 shown in FIG. 6. When it is decided at Step S68 that the retry has not been over, on the other hand, the procedure transfers to Step S64 so as to receive the control CH signal of the synchronization destination radio base station.

When it is decided at Step S65 that the reception of the control CH signal has succeeded, the radio side CPU 29 judges that the transmission positions of the control CH signal of the synchronization destination radio base station and own station are identical, and corrects the deviation of the transmission timing at the bit unit (at Step S70) thereby to lock the synchronization destination radio base station and own station completely in the synchronous state.

Moreover, the radio side CPU 29 initializes the retry counter, the measurement number counter and the deviation accumulation counter (at Steps S71, S72 and S73), and the procedure shifts to the fundamental deviation measuring operation of Step S19 of FIG. 6 (at Step S74).

According to the control CH positioning procedure shown in FIG. 9, the transmission position of the control CH signal of own station is matched with the transmission position of the control CH signal of the synchronization destination radio base station at the bit unit, so that the synchronization destination radio base station and own station can be brought into synchronous states.

Figure 10:
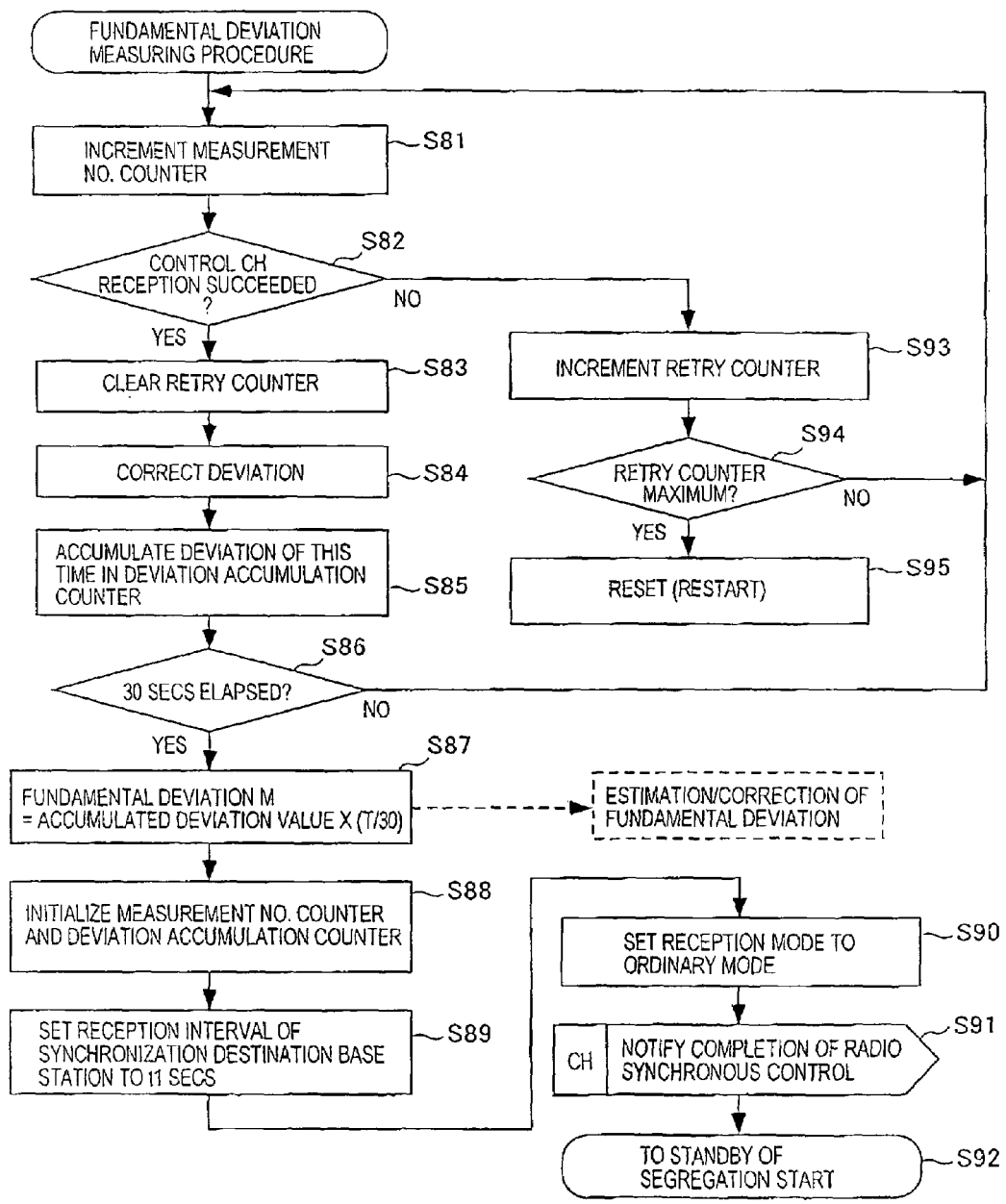
FIG. 10 is a flow chart showing processing operations of the fundamental deviation measuring procedure of the IP connection type radio base stations in the embodiment.

Here, the fundamental deviation measuring operation of Step S19 in the radio synchronization controlling procedure of FIG. 6 will be described. FIG. 10 is a flow chart showing processing operations on the fundamental deviation measuring procedure of the IP connection type radio base station 10.

In the radio synchronization, the deviation width time-allowed for the TDMA-TDD frame is within 52.1 µs. This allowance is intrinsically provided for absorbing the transitional response time to the transmission and stop of the electric wave in the hardware of a radio device, and consideration has to be taken into about 40 μs as the hardware error. The allowable error range to be assigned to the present radio synchronization soft control is a difference of about 12 μs between the deviation width of 52.1 μs and the hardware error of 40 μs and is converted into 5 bits.

The fundamental deviation measuring procedure shown in FIG. 10 acquires the data of a fundamental deviation M for monitoring the timing and correcting the synchronization destination radio base station periodically after the actual operation start so as to hold the synchronous state within the allowable error range of a bit margin of 5 bits.

In FIG. 10, the radio side CPU 29 increments the measurement number counter initialized at Step S72 of FIG. 9, by +1 (at Step S81). After this, the receiving operation of the control CH signal of the synchronization destination radio base station is executed again, and it is decided whether or not the reception of the control CH signal of the synchronization destination radio base station has succeeded (at Step S82).

When the reception of the control CH signal succeeded, the radio side CPU 29 clears the retry counter (at Step S83) and corrects the deviation between the TDMA-TDD frame timings of the synchronization destination radio base station and own station at the bit unit on the basis of the received information (at Step S84).

Moreover, the radio side CPU 29 adds up the deviation of the timing based on that received information in the deviation accumulation counter (at Step S85), and decides whether or not 30 secs have elapsed (at Step S86).

Here, the series operations are repeatedly executed, while working the ordinary service function without any useless starting time at the actual operation start, for 30 secs optimum for minimizing the influences on the voice communication quality to be given to the service function and for acquiring the data of the fundamental deviation necessary for continuing the radio synchronous state stably.

When it is decided at Step S86 that 30 secs elapsed, the radio side CPU 29 calculates the fundamental deviation M corresponding to the correcting operation period of T secs at and after the next time by multiplying the accumulated value of the deviation accumulation counter by T/30 (i.e., the monitor period of T secs shown in FIG. 7) (at Step S87) and initializes the measurement number counter and the deviation accumulation counter (at Step S88). Here, the fundamental deviation M of Step S87 is used as the fundamental data of the later-described estimation/correction of the fundamental deviation of FIG. 14.

After this, in order to monitor the synchronous timing of the TDMA-TDD frame with the synchronization destination radio base station in parallel with the actual operation of the device, the radio side CPU 29 sets the reception interval of the control CH signal of the synchronization destination radio base station to t1 secs (at Step S89), as shown in FIG. 7, and changes the setting of the electric wave reception mode for the hardware of own station from the full reception mode to the ordinary reception mode of the control CH signal of the synchronization destination radio base station (at Step S90). After this, the radio side CPU 29 notifies the more significant channel task of the completion of the radio synchronization control (at Step S91), and shifts to the segregation start standby operation of Step S20 shown in FIG. 6 (at Step S92).

When it is decided at Step S82 that the reception of the control CH signal did not succeed, moreover, the radio side CPU 29 increments the retry counter by +1 (at Step S93), and decides whether or not the retry counter has reached the maximum (at Step S94).

When it is decided that the retry counter has not reached the maximum, the radio side CPU 29 shifts to Step S81 so as to execute the operation for receiving the control CH signal. When it is decided at Step S94 that the retry counter reached the maximum, the radio side CPU 29 judges that the electric wave reception of the synchronization destination radio base station has failed, and resets the device of own station and executes the restart (at Step S95).

According to the fundamental deviation measuring procedure shown in FIG. 10, the transmission positions of the control CH signal are adjusted between the radio base station of the synchronization destination candidate and own station. After this, the time deviation from the control CH signal of the synchronization destination is measured for every preset periods so that it can be held as the fundamental deviation data of the bit unit in the timing adjusting table.

Figure 11:
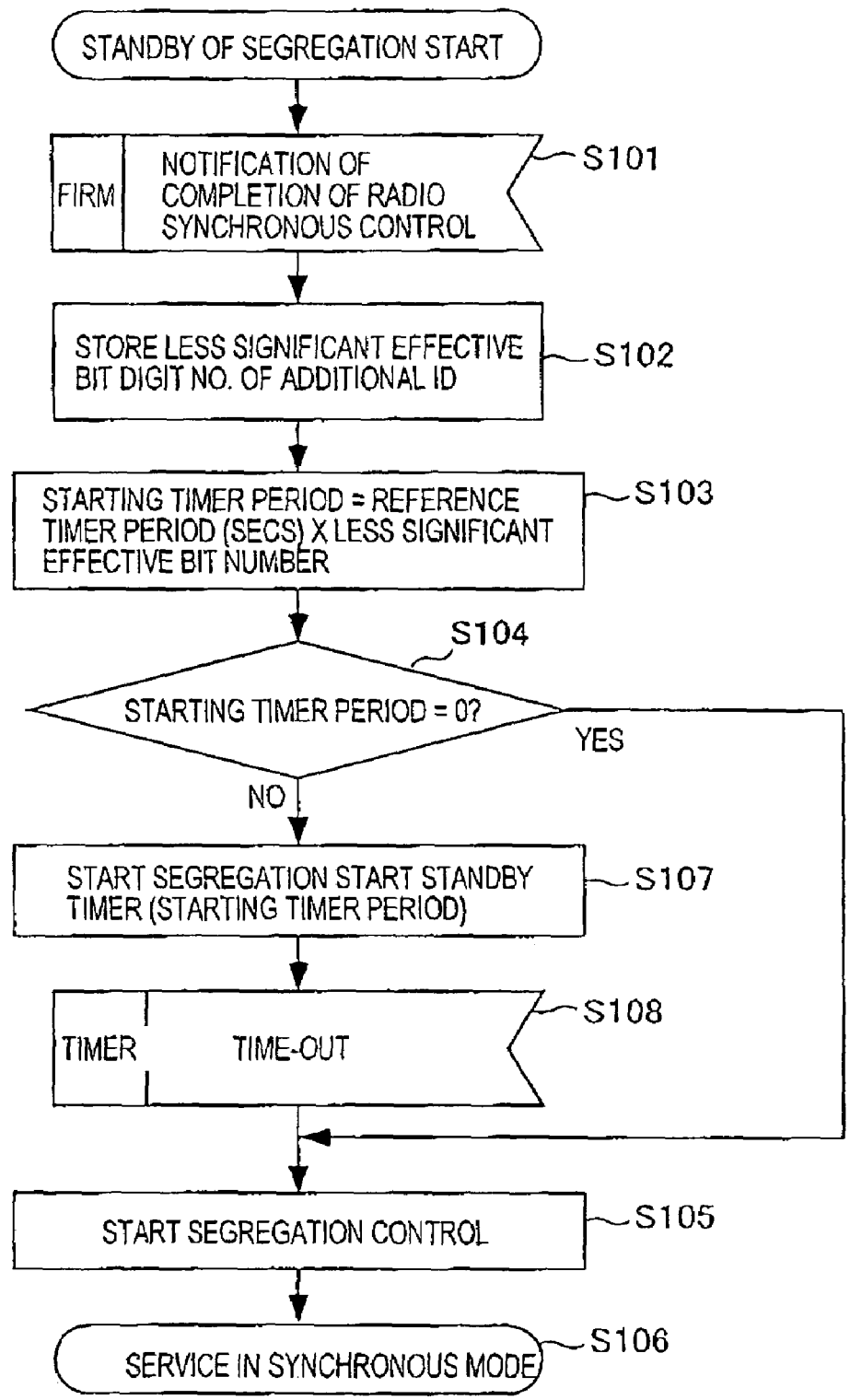
FIG. 11 is a flow chart showing processing operations of the segregation start standby operation of the IP connection type radio base stations in the embodiment.

Here, the segregation start standby operation of Step S20 in the radio synchronization controlling procedure of FIG. 6 will be described. FIG. 11 is a flow chart showing processing operations on the segregation start standby operation of the IP connection type radio base station 10.

In the segregation start standby procedure shown in FIG. 11, the starting timing of the segregation control for determining the transmission position of the control CH signal of own station is shifted, and the transmission position of the control CH of own station is then determined to the optimum one so that it may not overlap the transmission position of the control CH signal of another radio base station.

The radio side CPU 29 shown in FIG. 11 receives a notification of the completion of the synchronous control from the less significant program (at Step S101). After this, the radio side CPU 29 stores the less significant effective bit digit number (8 bits at the maximum) of the additional ID of own station or the parameter of the segregation start standby timing set at the address "106" of the packaged ID-ROM described in FIG. 5 (at Step S102), and accumulates the less significant effective bit digit number of the additional ID of own station and the reference timer period set at the address "105" of the ID-ROM thereby to calculate the starting timer period of the segregation control (at Step S103). In case the reference timer period is "30 secs", in case the less significant effective bit digit number is 4 and in case the additional ID of own station is "02", the less significant effective bit value is "2", so that the starting timer period is 60 secs by the calculation of 30 secs×2.

The radio side CPU 29 decides whether or not the calculated starting timer period is at "0" (at Step S104). When it is decided that the starting timer period is "0", the radio side CPU 29 judges that the segregation start standby period is not, and then instantly starts the segregation controlling operation for determining the transmission position of the control CH signal of own station within the interval range (at Step S105). The radio side CPU 29 decides the transmission position of the control CH signal of own station so as to prevent the overlap with another IP connection type radio base station 10 within the interval range, and then starts the service operation in the radio synchronized operation mode of Step S21 of FIG. 6 (at Step S106).

When it is decided at Step S104 that the starting timer period is not "0", on the other hand, the radio side CPU 29 starts the starting timer period (at Step S107). In the time-out case of the starting timer (at Step S108), the procedure shifts to Step S105 so as to start the segregation controlling operation of the transmission position of the control CH signal of own station.

According to the segregation start standby procedure shown in FIG. 11, a synchronization in the radio section with the reference radio base station is established, and the starting timer period is then calculated by adding up the less significant effective bit number of the additional ID of own station and the reference timer period. After the starting timer period elapsed from the start of the starting timer period, the processing operation of the segregation control for determining the transmission position of the control CH signal of own station. By shifting the segregation control start with time, therefore, the segregation control to determine the transmission position of the control CH signal simultaneously with another radio base station can be made to avoid the situation, in which the individual transmission positions might otherwise overlap, and to provide the smooth segregation control.

Figure 12:
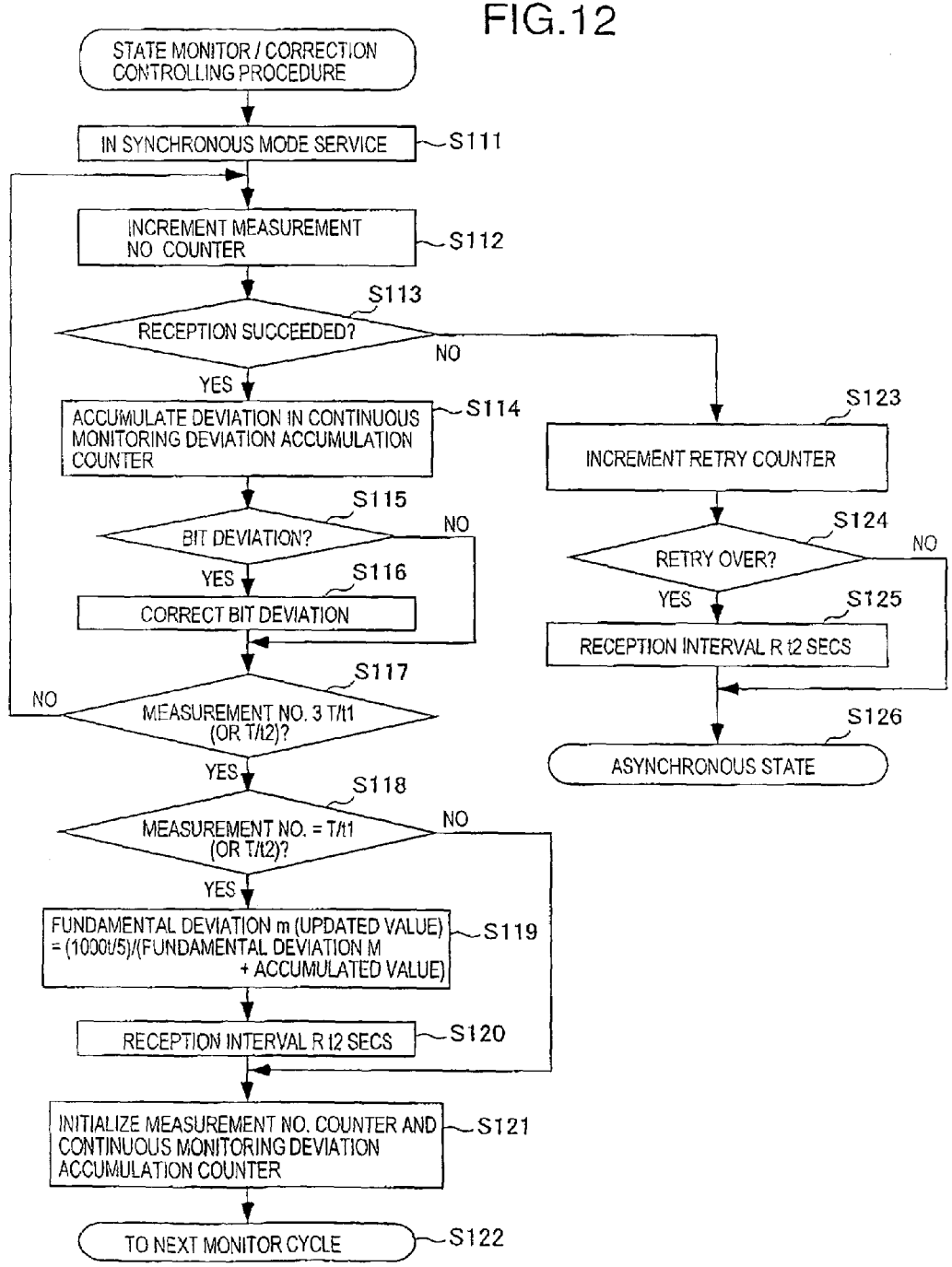
FIG. 12 is a flow chart showing processing operations on the state-monitoring/correction-controlling procedure of the IP connection type radio base stations in the embodiment.

Here, the state-monitoring/correction-controlling procedure in the radio synchronized operation mode service operation of Step S21 in the radio synchronization controlling procedure of FIG. 6 will be described. FIG. 12 is a flow chart showing processing operations on the state-monitor/correction-controlling procedure of the IP connection type radio base station 10.

In the state-monitoring/correction-controlling procedure shown in FIG. 12, in order to keep the wirelessly synchronized state in the synchronized operation mode service operation, as shown in FIG. 7, the synchronous timing corresponding to the monitor period (T secs) of one cycle of the TDMA-TDD frame of the synchronization destination radio base station is scanned for every preset scan-periods of t1 (or t2) secs, to correct the deviation of the bit unit from the frame timing, as obtained for every scan periods t1 (or t2), of the synchronization destination radio base station, and to obtain an updated value of the fundamental deviation M corresponding to the monitor period (T secs) of one cycle on the basis of the scan result of the scan period t1 (or t2). Here this updated value of the fundamental deviation M is the fundamental data for the added value of the deviation counter of the later-described deviation predicting/correcting procedure of FIG. 14.

In the synchronized operation mode service operation (at Step S111), the radio side CPU 29 shown in FIG. 12 increments the measurement number counter by +1 (at Step S112), and then executes the receiving operation of the control CH signal of the synchronization destination radio base station and decides whether or not the reception of the control CH signal has succeeded (at Step S113).

When the reception of the control CH signal succeeded, the radio side CPU 29 adds up the deviation between the control CH signal of the synchronization destination radio base station and the control CH signal of own station in the continuous monitoring deviation accumulation counter (at Step S114).

The radio side CPU 29 decides whether or not a bit deviation of ±3 bits or more has occurred between the control CH signal of the synchronization destination radio base station and the control CH signal of own station (at Step S115). When it is decided that a bit deviation of ±3 bits or more has occurred, the radio side CPU 29 corrects the bit deviation (at Step S116). The reason why the bit deviation less than ±3 has been allowed at Step S115 is that the prediction correction is sequentially executed within a range of ±1 bits with the interruptions of every slots in the later-described fundamental deviation predicting/correcting procedure of FIG. 14.

When the bit deviation is corrected, the radio side CPU 29 decides the measurement number for the monitor period T (secs) of one cycle is at a preset number (T/t1) or more (at Step S117). When it is decided that the measurement number was at the preset number (T/t1) or more, the radio side CPU 29 decides whether or not the measurement number is the preset number (T/t1) (at Step S118).

When it is decided that the measurement number was T/t1, the radio side CPU 29 calculates an updated value of the fundamental deviation M (at Step S119) by dividing the total data quantity (1000·T/5) corresponding to the monitor period of T secs of one cycle, as shown in FIG. 7, by the sum of the fundamental deviation M calculated at Step S87 of FIG. 10 and the accumulated value of the deviation accumulation counter at this measurement.

The radio side CPU 29 updates the fundamental deviation M held in the current timing adjusting table on the basis of the calculation result of Step S119.

Moreover, the radio side CPU 29 changes the setting (at Step S120) of the reception interval of the control CH signal of the synchronization destination radio base station, after it calculated the updated value of the fundamental deviation M, from the scan period of t1 secs of the first cycle to the scan period of t2 secs (=t1×10 sec) of the second and later cycles of longer periods as shown in FIG. 7.

There are two reasons for changing the setting of the scan period from t1 secs to t2 secs. Firstly, the full reception mode is established exclusively for the synchronization monitor even for an instantaneous scan period of 5 ms, so that the communication error occurs in the radio sections. This error factor is minimized to prevent the deterioration in the voice communication quality of the ordinary service. Secondly, at the second and subsequent cycles, the fundamental deviation measuring procedure (as referred to FIG. 10) and the operation of the first cycle have already succeeded. Therefore, it is possible to judge that data of a reliable fundamental deviation M have already been acquired for holding the radio synchronous state continuously.

When the setting was changed to the monitor period t2 at Step S120, the radio side CPU 29 initializes the measurement number counter and the continuous monitoring deviation accumulation counter (at Step S121), and the procedure then shifts to the monitoring operation at next and subsequent cycles (at Step S122).

When the reception of the control CH signal did not succeed at Step S113, on the other hand, the radio side CPU 29 increments the retry counter by +1 (at Step S123), and decides (at Step S124) whether or not the retry counter has been over.

When it is decided that the retry counter was over, the radio side CPU 29 sets the reception interval (or the scan period) forcibly to the period t2 which exerts no influence on the voice communication quality (at Step 5125), and the procedure then shifts to the self operation mode (at Step S126) in the asynchronous state as the failure in the radio synchronization.

When the procedure shifts at Step S122 to the monitoring operation of the next cycle, the radio side CPU 29 transfers to the processing operation of Step S111. At this time, the preset number of the measurement numbers of Step S117 and Step S118 is not T/t1 but T/t2 (wherein the period of t1 secs applies only to the monitor of the first cycle).

According to the state-monitoring/correction-controlling procedure shown in FIG. 12, the synchronous timing corresponding to the monitor period (T secs) of one cycle of the TDMA-TDD frame of the synchronization destination radio base station is scanned for every preset scan period t1 (or t2), thereby to correct the bit deviation from the frame timing, as obtained for each scan period t1 (or t2), of the synchronization destination radio base station, and to acquire an updated value of the fundamental deviation M corresponding to the monitor period (T secs) of one cycle on the basis of the monitor result of the scan period t1 (or t2). It is, therefore, possible to keep the radio synchronous state stably in the synchronized operation mode service.

Figure 13:
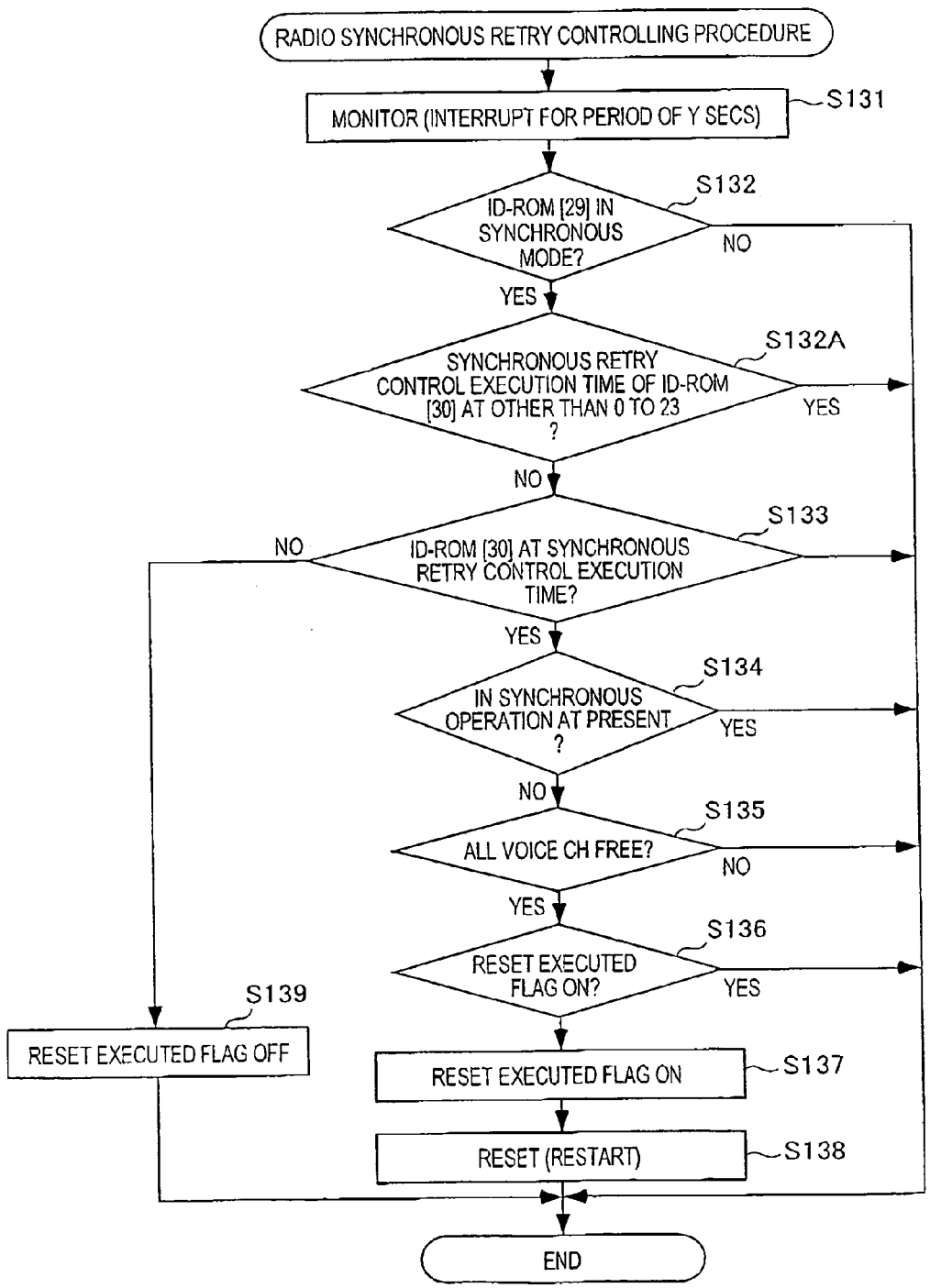
FIG. 13 is a flow chart showing processing operations on the synchronous retry controlling procedure of the IP connection type radio base stations in the embodiment.

Here, the radio synchronous retry controlling operation of Step S23 in the radio synchronization controlling procedure of FIG. 6 will be described. FIG. 13 is a flow chart showing processing operations on the radio synchronous retry controlling operation of the IP connection type radio base station 10.

The radio synchronous retry controlling operation shown in FIG. 13 is to execute the radio synchronous retry operations in response to preset conditions when the preset time becomes the retry control executing time, in case the radio synchronous state cannot be held to go to an asynchronous state by a trouble or reset of the synchronization destination radio base station or by the electric wave interference of another radio device.

When an interruption monitoring operation is executed at an arbitrary period of Y secs (at Step S131), the radio side CPU 29 shown in FIG. 13 decides (at Step S132) whether or not the operation mode set at the address "29" of the packaged ID-ROM shown in FIG. 5 is in the synchronized operation mode.

When it is decided that the operation mode is set in the synchronized operation mode, the radio side CPU 29 decides whether or not the synchronous retry control execution time set at the address "30" of the packaged ID-ROM shown in FIG. 5 is other than 0 to 23 (at Step S132A).

When it is decided that the synchronous retry control execution time is other than 0 to 23, the radio side CPU 29 decides whether or not the present time is at the synchronous retry control executing time set at the address "30" of the ID-ROM (at Step S133).

When it is decided that the present time is at the synchronous retry control executing time, the radio side CPU 29 decides whether or not own station holds the operation state in the synchronized operation mode at present (at Step S134).

When it is decided that own station is not holding the operation state in the synchronized operation mode, the radio side CPU 29 decides, in case the self operation mode has been brought by the asynchronous state, whether or not all voice CH is free, so as to prevent the voice CH being used in advance from being forcibly cut by executing the resetting (at Step S135).

When it is decided that all voice CH is free, the radio side CPU 29 decides whether or not a reset executed flag indicating that the retry operation has already been executed on the same day is ON, so as to prevent a drawback that the service operation is positively stopped by repeating the resetting operation (at Step S136).

When it is decided that the reset executed flag is not ON, the radio side CPU 29 decides that the retry operation has not been executed on the same day, and ends this processing operation by turning ON the reset executed flag (at Step S137) and by executing the reset operation by the radio synchronous retry operations (at Step S138).

When it is decided at Step S132 that the set operation mode is not in the synchronized operation mode, at Step S132A that the synchronous retry control execution time is other than 0 to 23, at Step S134 that the operation state is in the synchronized operation mode, or at Step S135 that all voice CH is not free, then the radio side CPU 29 ends this processing procedure without executing the resetting operation by the radio synchronous retry operation.

When it is decided at Step S136 that the reset executed flag is ON, the radio side CPU 29 judges that the radio synchronous retry operation has been performed on the same day, and ends this processing procedure without executing the reset operation by that radio synchronous retry operation.

When it is decided at Step S133 that the present time is not the synchronous retry control execution time, the radio side CPU 29 ends this processing procedure by setting OFF the reset executed flag (at Step S139).

According to the radio synchronous retry controlling procedure shown in FIG. 13, the radio side CPU 29 executes the resetting the device forcibly to execute the processing operations of the radio synchronous control, when the present time becomes the retry control execution time in the asynchronous state and if all the conditions of Steps S132, S132A, S133, S134, S135 and S136 are satisfied, so that it can restore the synchronized operation mode autonomously to warrant the stable operations of the system.

Figure 14:
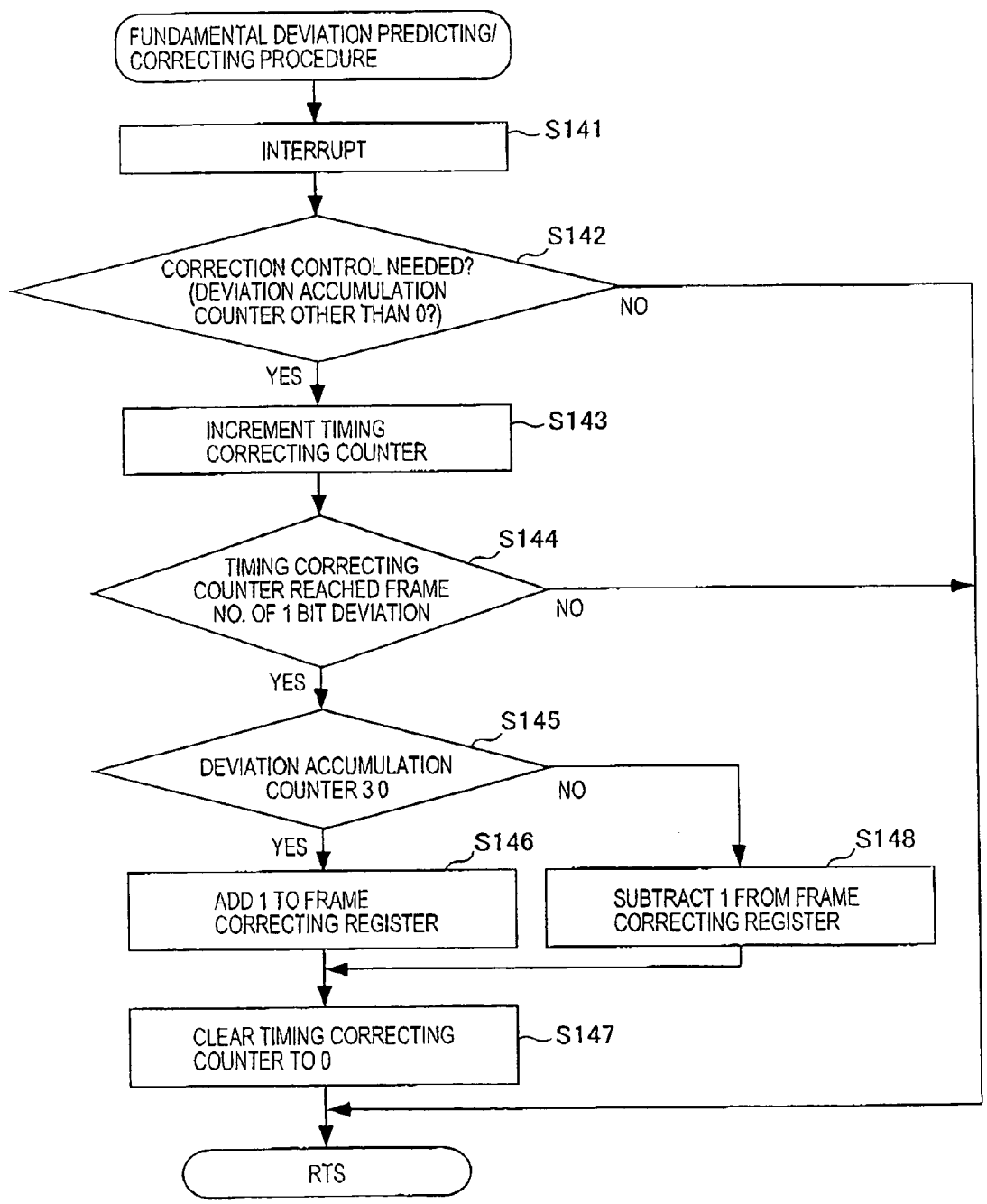
FIG. 14 is a flow chart showing processing operations on the fundamental deviation predicting/correcting procedure of the IP connection type radio base stations in the embodiment.

FIG. 14 is a flow chart showing the processing operations on the fundamental deviation predicting/correcting procedure of the synchronous timing of the IP connection type radio base station 10.

The fundamental deviation predicting/correcting procedure shown in FIG. 14 is a subroutine procedure which is executed at all times with a subroutine program of a packaged firmware by interruptions. In this subroutine procedure, the deviation in the TDMA-TDD frame timing between own station and the synchronization destination radio base station with respect to a next monitor period is predicted and corrected within a range of ±1 bit on the basis of the fundamental deviation M with the value added up in the deviation accumulation counter by feeding back the result to a frame correcting register packaged in the TDMA-TDD processing unit 26 of the hardware.

In FIG. 14, the radio side CPU 29 interrupts for every slots of the TDMA-TDD frame (at Step S141), and decides whether or not the value of the deviation accumulation counter is other than 0 (at Step S142).

When it is decided that the deviation accumulation counter is other than 0, the radio side CPU 29 judges that the correction control is necessary, and increments the timing correcting counter by +1 (at Step S143). After this, the radio side CPU 29 decides whether or not the timing correcting counter has reached the frame number of 1 bit deviation (at Step S144).

When it is decided that the timing correcting counter has reached the frame number of 1 bit deviation, the radio side CPU 29 decides whether or not the value of the deviation accumulation counter is at 0 or more (at Step S145).

When it is decided that the deviation accumulation counter is at 0 or more, the radio side CPU 29 judges that the deviation is in the plus direction, and adds 1 to the frame correcting register packaged in the TDMA-TDD processing unit 26 of the hardware (at Step S146).

When the value 1 is added to the frame correcting register, the radio side CPU 29 makes the correction at the bit unit in the slot at the instant that the timing deviation occurred, on the basis of the predicted deviation having calculated the frame width of own station. After the end of this correcting operation, this processing procedure is ended by clearing the timing correcting counter (at Step S147).

When it is decided at Step S145 that the value of the deviation accumulation counter is not at 0 or more, on the other hand, the radio side CPU 29 judges that the deviation is in the minus direction, and subtracts 1 from the frame correcting register (at Step S148). The correction is made at the bit unit in the slot at the instant that the timing deviation occurred, on the basis of the predicted deviation having calculated the frame width of own station. After the end of this correcting operation, the procedure shifts to Step S147 so as to clear the timing correcting counter.

According to the fundamental deviation predicting/correcting procedure shown in FIG. 14, the deviation in the TDMA-TDD frame timing between own station and the synchronization destination radio base station with respect to the next monitor period can be predicted and corrected within the range of ±1 bit on the basis of the fundamental deviation M with the value added up in the deviation accumulation counter by feeding back the result to the frame correcting register packaged in the TDMA-TDD processing unit 26 of the hardware.

When it is decided that own station is in the synchronized operation mode, according to the embodiment, the frame signal containing the control CH signal is received from one of the radio base stations except own station, the one being selected for reference to the frame synchronization, and the transmission timing of the frame signal of own station is matched with the transmission position of the control CH signal in the frame signal, so that the frame synchronization is established in the radio section between own station and the reference radio base station. Even between the different type radio base stations such as the general type radio base station 1 connected with the private branch exchange 4 through the ISDN line 3, the IP connection type radio base station 10 connected with the private branch exchange 4 connected through the LAN 6 and the main digital cordless phone 2, the frame synchronization is established in the radio section, and the segregation control to determine the transmission position of the control CH signal after established is executed at the standby timing to absorb the time difference of the start by the synchronous control. It is, therefore, possible to retain the efficiently effective use of the electric waves and to prevent the electric wave interference between the radio base stations thereby to improve the service quality drastically.

As shown in the control CH signal scanning procedure of FIG. 8, according to the embodiment, the radio base station detects, when it receives the frame signal containing the control CH signal from the radio base station other than own station, the calling code, the reception level and the additional ID of the radio base station having transmitted the frame signal, on the basis of control information contained in the frame signal, and determines the radio base station as the reference radio base station, when the calling codes of the radio base station and own station are identical, when the reception level between the radio base station and own station is at a threshold level or higher, and when it is decided on the basis of the comparison of the additional ID between the radio base station and own station that the radio base station satisfies the conditions for reference to the radio synchronization of own station. In the whole system, therefore, the most suitable one of the individual radio base stations can be the reference radio base station.

As shown in the radio synchronous retry controlling procedure of FIG. 13, according to the embodiment, the radio base station executes the radio synchronous operation to establish the synchronization in the radio section between own station and the reference radio base station, when the present time becomes the synchronous retry control executing instant even in case the synchronous state cannot be held in the radio section between own station and the reference radio base station. It is, therefore, possible to restore the synchronous state between own station and the radio base station autonomously.

As shown in the control CH signal scanning procedure of FIG. 8, according to the embodiment, the timer to measure the detection executing period Tx is started when it is decided that own station is in the synchronized operation mode, and the operation in the self operation mode is started to output the electric waves of the frame signal at an arbitrary transmission timing of own station, in case the frame synchronization in the radio section between own station and the reference radio base station cannot be established within that detection executing period Tx. It is, therefore, possible to avoid such a situation reliably as could not otherwise start the service operation because the synchronization in the radio section between the reference radio base station and own station cannot be established.

According to the mobile communication system of the invention, the radio base station includes operation modes having the self operation mode, in which the electric waves of the frame signal are outputted at an arbitrary transmission timing of own station, and the synchronized operation mode, in which the electric waves of the frame signal are outputted after the frame synchronization in the radio section between own station and said reference radio base station was established, and the operation modes of the individual radio base stations can be arbitrarily changed in their setting in response to the preset operation from a maintenance terminal connected with the control device of the private branch exchange 4. Therefore, the change, if any, in the setting of the operation mode of the radio base station after the system operation can be sufficiently coped with.

As shown in the segregation start standby procedure of FIG. 11, according to the embodiment, the starting timer period is calculated, after the synchronization in the radio section with the reference radio base station was established, by accumulating the less significant effective bit number of the additional ID (e.g., 8 bits at the maximum) of own station and the reference timer period. After lapse of the starting timer period started, the processing operation for the segregation control to determine the transmission position of the control CH signal of own station is executed. By shifting the starting timing of the segregation control with time, therefore, it is possible to avoid the situation, in which the plural radio base stations might otherwise perform the segregation control to determine the transmission position of the control CH signal altogether, thereby to provide a smooth segregation control.

Here, the embodiment has been described on the case, in which the reference station is the general radio base station 1 and in which the radio base station to be wirelessly synchronized with that reference station is the IP connection type radio base station 10A. However, it is needless to say that similar effects could be obtained even if the radio base station to be synchronized with the reference station is exemplified by the main digital cordless phone 2.

In the embodiment, moreover, the setting information and the status information such as the active operation mode or the additional ID may be set for every radio base stations (e.g., the general type radio base station 1, the IP connection type radio base station 10 or the main digital cordless phone 2), so that confirmation information 309 such as the setting information or the status information of the radio base stations may be recognized by various confirmation means 307 (or confirmation methods 308), as shown in FIG. 15.

For example, the active operation mode or the additional ID of the individual radio base stations are managed altogether by the control device of the private branch exchange 4. When a maintenance command is introduced from a maintenance terminal connected with the serial port of that control device, the maintenance terminal may display on the screen the operation mode of a specific radio base station, the status information such as the activation, the self operation mode, the synchronized operation mode, the closing, the trouble or the power OFF, the additional ID of the synchronization destination radio base Station, the control CH information of the use. Even from the PC terminal connected with the LAN, various pieces of information such as the setting information or the status information of a specific radio base station may also be displayed on the screen in response to a designating operation.

On the other hand, the information notifying unit 27 of the IP connection type radio base station 10 may be provided with an LED lamp and an LCD display unit. For example, the display contents of the LED lamp may notify the active operation modes of the radio base station such as the synchronous operation in blue color, the self operation in green color and the closure in red color, and the LCD display unit may notify the additional ID of the synchronization destination radio base station or the operation mode of own station.

Even between the radio base stations of the different kinds such as the general type radio base station connected with the private branch exchange through the ISDN line, the IP connection type radio base station connected with the private branch exchange connected through the LAN and the main digital cordless phone, the mobile communication system of the invention establishes the frame synchronization in the radio section, and executes the segregation control to determine the transmission position of the control CH signal after established. It is, therefore, possible to retain the efficiently effective use of the electric waves and to prevent the electric wave interference between the radio base stations thereby to improve the service quality drastically. Thus, the invention is useful in the TDMA type mobile communication system or the like.

When the synchronized operation mode setting is detected, according to the mobile communication system of the invention thus far described, the frame signal containing the control CH signal is received from such one of the radio base stations other than own station as is selected for reference to the frame synchronization, and the transmission of the frame signal of own station is timed to the transmission position of the control CH signal in the frame signal, so that the frame synchronization is established in the radio section between own station and the reference radio base station. Even between the radio base stations of the different kinds such as the general type radio base station connected with the private branch exchange through the ISDN line, the IP connection type radio base station connected with the private branch exchange connected through the LAN and the main digital cordless phone, the frame synchronization is established in the radio section, and the segregation control to determine the transmission position of the control CH signal after established is executed at the standby timing to absorb the time difference of the start by the synchronous control. It is, therefore, possible to retain the efficiently effective use of the electric waves and to prevent the electric wave interference between the radio base stations thereby to improve the service quality drastically.

From the viewpoint of establishing the synchronization all over the common system, the reference radio base station is desired to be such a general type as can receive the synchronous signal from the private branch exchange through the ISDN line.

According to the mobile communication system of the invention, moreover, the radio base station detects, when it receives the frame signal containing the control CH signal from the radio base station other than own station, the calling code, the reception level and the additional ID of the radio base station having transmitted the frame signal, on the basis of control information contained in the frame signal, and determines the radio base station as the reference to the frame synchronization, when the calling codes of the radio base station and own station are identical, when the reception level between the radio base station and own station is at the threshold level or higher, and when it is decided on the basis of the comparison of the additional ID between the radio base station and own station that the radio base station satisfies all the conditions. Therefore, the radio base station having the most suitable radio synchronous condition can be the reference radio base station.

According to the mobile communication system of the invention, moreover, the radio base station executes the radio synchronous operation to establish the frame synchronization in the radio section between own station and the reference radio base station selected again, when the present time becomes the present instant even in case the synchronous state cannot be held in the radio section between own station and the reference radio base station. It is, therefore, possible to restore the synchronous state between own station and the radio base station autonomously.

According to the mobile communication system of the invention, moreover, the preset timer to measure the detection executing period Tx is started when the synchronized operation mode setting is detected, and the operation in the self operation mode is started to output the electric waves of the frame signal at an arbitrary transmission timing of own station, either in case own station and the reference radio base station cannot be detected or in case the frame synchronization in the radio section with the reference radio base station cannot be established, till the predetermined timer is up. It is, therefore, possible to avoid such a situation reliably as could not otherwise start the service operation because the synchronization in the radio section between the reference radio base station and own station cannot be established.

According to the mobile communication system of the invention, moreover, the radio base station includes operation modes having a self operation mode, in which the electric waves of the frame signal are outputted at an arbitrary transmission timing of own station, and a synchronized operation mode, in which the electric waves of the frame signal are outputted after the frame synchronization in the radio section between own station and said reference radio base station was established, and the operation modes of the individual radio base stations can be changed in their setting in response to a preset operation of the private branch exchange such as a preset operation from the maintenance terminal connected with the control device of the private branch exchange 4. Therefore, the change, if any, in the setting of the operation mode of the radio base station after the system operation can be sufficiently coped with.

According to the mobile communication system of the invention, moreover, after the synchronization in the radio section between own station and the reference radio base station was established, the starting timing of the segregation control to determine the transmission position of the control CH signal of own station is controlled on the basis of the timer period or the result of the accumulation result of the preset less significant effective bit number of the additional ID of own station and the reference timer period. In case the additional ID of own station is "2" and in case the reference timer period is 30 secs, for example, the timer period is 60 secs so that the control is made to await the starting timing of the segregation control by 60 secs. By shifting the starting timing of the segregation control with time, therefore, it is possible to avoid the situation, in which the plural radio base stations might otherwise perform the segregation control to determine the transmission position of the control CH signal altogether, thereby to provide the smooth segregation control.

What is claimed is:

1. A mobile communication system comprising:
   a plurality of radio base stations whose system types are different each other;
   mobile phones wirelessly connected with the plurality of radio base stations; and
   a private branch exchange wired with the plurality of radio base stations, wherein
   an identical calling code is provided to each reference radio base station designated as belonging to a predetermined radio base station group, and a minimum additional ID is provided to said each reference radio base station designated as belonging to the predetermined radio base station group, where the minimum additional ID provided to said each reference radio base station is different from any other minimum additional ID provided to other reference radio base stations belonging to the predetermined radio base station group;
   a given reference radio base station is adapted to receive a frame signal transmitted from another reference radio base station, where the frame signal contains radio synchronous conditions including the calling code of the another reference radio base station which transmitted the frame signal, a reception threshold level which indicates a predetermined satisfactory reception level of the frame signal, and the minimum additional ID of the another reference radio base station which transmitted the frame signal,
   when the given reference radio base station receives the frame signal containing a control CH signal from the another reference radio base station, the given reference radio base station detects the calling code, the reception threshold level and the minimum additional ID of the another reference radio base station which transmitted the frame signal, on the basis of control information contained in the control CH signal of the frame signal, and determines the another reference radio base station which transmitted the frame signal as a radio base station to be synchronized-to, if all three conditions of: the calling codes of the another reference radio base station which transmitted the frame signal and the given reference radio base station are identical, the reception threshold level is equal to or more than a predetermined level, and the minimum additional ID level of the another reference radio base station which transmitted the frame signal is smaller than the minimum additional ID level of the given reference radio base station, are met, and responsive to the conditions being met, matches a transmission timing of the frame signal of the given reference radio base station with a transmission position of the control CH signal in the frame signal transmitted from the another reference radio base station, whereby a frame synchronization in a radio section between the given reference radio base station and the another reference radio base station is established.

2. A mobile communication system according to claim 1, wherein
   when a present elapsed time meets or exceeds a predetermined elapse time in a case where a synchronous state cannot be established in the radio section between the given reference radio base station and the another reference radio base station, the given reference radio base station receives a new frame signal containing the control CH signal from the another reference radio base station again; and matches the transmission timing of the frame signal of the given reference radio base station with a transmission position of the control CH signal in the frame signal if the conditions are met, whereby a frame synchronization in the radio section between the given reference radio base station and the another reference radio base station is established.

3. A mobile communication system according to claim 1, wherein when the given reference radio base station detects initiation of an attempted synchronized operation mode setting, the given reference radio base station starts a preset period timer, and starts operation in a self operation mode to output electric waves of the frame signal at an arbitrary transmission timing of the given reference radio base station, in a case where the frame synchronization in the radio section between the given reference radio base station and the another reference radio base station cannot be established within a predetermined time period of the preset period timer.

4. A mobile communication system according to claim 1, wherein:
   the given reference radio base station has operation modes including a self operation mode, in which electric waves of the frame signal are outputted at an arbitrary transmission timing of the given reference radio base station, and a synchronized operation mode, in which the electric waves of the frame signal of the given reference radio base station are outputted after the frame synchronization in the radio section between the given reference radio base station and the another reference radio base station was established; and
   the private branch exchange can change a selected operation mode of each of the radio base stations to the self operation mode or the synchronized operation mode, in response to a predetermined operation.

5. A mobile communication system according to claim 1, wherein:
   the mobile communication system has additional IDs added to each group of the radio base stations; and
   after the frame synchronization was established in the radio section between the given reference radio base station and the another reference radio base station, the given reference radio base station controls start timing of a segregation control for determining the transmission position of the control CH signal of the given reference radio base station, so as to do not overlap with the transmission position of the control CH signal of the another reference radio base station, on the basis of a timer period resulting from accumulation of the less significant effective bit number of the additional ID of the given reference base radio station and the reference timer period.

6. A radio base station which communicates with a mobile phone, wherein an identical calling code provided to all radio base stations designated as belonging to a predetermined radio base station group to which the radio base station belongs, is provided to the radio base station, and a minimum additional ID is provided to the radio base station, where the minimum additional ID provided to the reference radio base station is different from an other minimum additional ID provided to other reference radio base stations belonging to the predetermined radio base station group;

the radio base station is adapted to receive a frame signal transmitted from another reference radio base station, where the frame signal contains radio synchronous conditions including the calling code of the another reference radio base station which transmitted the frame signal, a reception threshold level which indicates a predetermined satisfactory reception level of the frame signal, and the minimum additional ID of the another reference radio base station which transmitted the frame signal, when the radio base station receives the frame signal containing a control CH signal from the another reference radio base station, the radio base station detects the calling code, the reception threshold level and the minimum additional ID of the another reference radio base station which transmitted the frame signal, on the basis of control information contained in the control CH signal of the frame signal, and determines the another reference radio base station which transmitted the frame signal as a radio base station to be synchronized-to, if all three conditions of: the calling codes of the another reference radio base station which transmitted the frame signal and the radio base station are identical, the reception threshold level is equal to or more than a predetermined level, and the minimum additional ID level of the another reference radio base station which transmitted the frame signal is smaller than the minimum additional ID level of the radio base station, are met, and responsive to the conditions being met, matches a transmission timing of the frame signal of the radio base station with a transmission position of the control CH signal in the frame signal transmitted from the another reference radio base station, whereby a frame synchronization in a radio section between the radio base station and the another reference radio base station is established.

7. A radio base station according to claim 6, wherein when a present elapsed time meets or exceeds a predetermined elapse time in a case where a synchronous state cannot be established in the radio section between the radio base station and the another reference radio base station, the radio base station receives a new frame signal containing the control CH signal from the another reference radio base station again; and matches the transmission timing of the frame signal of the radio base station with a transmission position of the control CH signal in the frame signal if the conditions are met, whereby a frame synchronization in the radio section between the radio base station and the another reference radio base station is established.

8. A radio base station according to claim 6, wherein wherein when the radio base station detects initiation of an attempted synchronized operation mode setting, the radio base station starts a preset period timer, and starts operation in a self operation mode to output electric waves of the frame signal at an arbitrary transmission timing of the radio base station, in a case where the frame synchronization in the radio section between the radio base station and the another reference radio base station cannot be established within a predetermined time period of the preset period timer.

9. A radio base station according to claim 6, wherein the radio base station has operation modes including a self operation mode, in which electric waves of the frame signal are outputted at an arbitrary transmission timing of the radio base station, and a synchronized operation mode, in which the electric waves of the frame signal of the radio base station are outputted after the frame synchronization in the radio section between the radio base station and the another reference radio base station was established.

10. A radio base station according to claim 6, wherein:
the mobile communication system has additional IDs added to each group of the radio base stations; and
after the frame synchronization was established in the radio section between the radio base station and the another reference radio base station, the radio base station controls start timing of a segregation control for determining the transmission position of the control CH signal of the radio base station, so as to do not overlap with the transmission position of the control CH signal of the another reference radio base station, on the basis of a timer period resulting from accumulation of the less significant effective bit number of the additional ID of the base radio station and the reference timer period.

11. A frame synchronization establishing method for a mobile communication system comprising: a plurality of radio base stations whose system types are different each other; mobile phones wirelessly connected with the plurality of radio base stations; and a private branch exchange wired with the plurality of radio base stations, wherein an identical calling code is provided to each reference radio base station designated as belonging to a predetermined radio base station group, and a minimum additional ID is provided to said each reference radio base station designated as belonging to the predetermined radio base station group, where the minimum additional ID provided to said each reference radio base station is different from any other minimum additional ID provided to other reference radio base stations belonging to the predetermined radio base station group;

the method comprising:

receiving a frame signal transmitted from another reference radio base station at a given reference radio base station, where the frame signal contains radio synchronous conditions including the calling code of the another reference radio base station which transmitted the frame signal, a reception threshold level which indicates a predetermined satisfactory reception level of the frame signal, and the minimum additional ID of the another reference radio base station which transmitted the frame signal, detecting, when the given reference radio base station receives the frame signal containing a control CH signal from the another reference radio base station, the calling code, the reception threshold level and the minimum additional ID of the another reference radio base station which transmitted the frame signal, on the basis of control information contained in the control CH signal of the frame signal, and determining the another reference radio base station which transmitted the frame signal as a radio base station to be synchronized-to, if all three conditions of: the calling codes of the another reference radio base station which transmitted the frame signal and the given reference radio base station are identical, the reception threshold level is equal to or more than a predetermined level, and the minimum additional ID level of the another reference radio base station which transmitted the frame signal is smaller than the minimum additional ID level of the given reference radio base station, are met, and responsive to the conditions being met, matching a transmission timing of the frame signal of the given reference radio base station with a transmission position of the control CH signal in the frame signal transmitted from the another reference radio base station, whereby a frame synchronization in a radio section between the given reference radio base station and the another reference radio base station is established.

* * * * *